US012732333B2

(12) United States Patent
Ying et al.

(10) Patent No.: US 12,732,333 B2
(45) Date of Patent: Sep. 8, 2026

(54) JOINT OPERATION OF DEFERRED SPS HARQ-ACK AND CELL SWITCHING

(71) Applicant: SHARP KABUSHIKI KAISHA, Sakai City (JP)

(72) Inventors: Kai Ying, Vancouver, WA (US); Zhanping Yin, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 299 days.

(21) Appl. No.: 18/705,474

(22) PCT Filed: Oct. 21, 2022

(86) PCT No.: PCT/JP2022/039261

§ 371 (c)(1),
(2) Date: Apr. 26, 2024

(87) PCT Pub. No.: WO2023/079981

PCT Pub. Date: May 11, 2023

(65) Prior Publication Data

US 2025/0015958 A1 Jan. 9, 2025

Related U.S. Application Data

(60) Provisional application No. 63/275,849, filed on Nov. 4, 2021.

(51) Int. Cl.
*H04L 5/00* (2006.01)
*H04W 72/11* (2023.01)
*H04W 72/21* (2023.01)

(52) U.S. Cl.
CPC .......... *H04L 5/0055* (2013.01); *H04W 72/11* (2023.01); *H04W 72/21* (2023.01)

(58) Field of Classification Search
None
See application file for complete search history.

(56) References Cited

U.S. PATENT DOCUMENTS

2022/0007399 A1 1/2022 Rastegardoost et al.
2022/0353046 A1* 11/2022 Matsumura ......... H04W 72/231
(Continued)

FOREIGN PATENT DOCUMENTS

WO 2021/146702 A1 7/2021

OTHER PUBLICATIONS

Moderator (Nokia), "Moderator summary #2 on HARQ-ACK feedback enhancements for NR Rel-17 URLLC/IIoT", R1-2108440, 3GPP TSG-RAN WG1 Meeting #106-e, e-Meeting, Aug. 16, 2021-Aug. 27, 2021, Aug. 23, 2021(Aug. 23, 2021), XP052042634.
(Continued)

*Primary Examiner* — Yaotang Wang
(74) *Attorney, Agent, or Firm* — ScienBiziP, P.C.

(57) ABSTRACT

A user equipment (UE) is described. The UE may include receiving circuitry configured to receive a first radio resource control (RRC) message comprising first information used for configuring a Semi-Persistent Scheduling (SPS) physical downlink shared channel (PDSCH) configuration, to receive a second RRC message comprising second information used for configuring that deferring of SPS hybrid automatic repeat request-acknowledgement (HARQ-ACK) is supported, to receive a third RRC message comprising third information used for configuring cell switching (based on semi-static configuration and/or dynamic indication), and to receive, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS
(Continued)

PDSCH transmission. The UE may also include transmitting circuitry configured to transmit HARQ-ACK information and configured to defer the HARQ-ACK information transmission.

3 Claims, 12 Drawing Sheets

(56) References Cited

U.S. PATENT DOCUMENTS

2023/0045191 A1* 2/2023 Dimou .................. H04L 1/1854
2023/0112147 A1* 4/2023 Chien .................. H04L 1/1854 370/329
2023/0155744 A1* 5/2023 Bae ....................... H04L 1/1864 370/280
2024/0381366 A1* 11/2024 Chien .................. H04W 72/11

OTHER PUBLICATIONS

CATT , "UE feedback enhancements for HARQ-ACK", R1-2106962, 3GPP TSG RAN WG1 #106-e e-Meeting, Aug. 16-27, 2021.
Qualcomm Incorporated, "HARO-ACK enhancement for IOT and URLLC", R1-2107336, 3GPP TSG RAN WG1 #106-e , e-Meeting, Aug. 16-27, 2021.

* cited by examiner

JOINT OPERATION OF DEFERRED SPS HARQ-ACK AND CELL SWITCHING

TECHNICAL FIELD

The present disclosure relates generally to communication systems. More specifically, the present disclosure relates to joint operation of deferred SPS HARQ-ACK and cell switching.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: receiving circuitry configured to receive a first radio resource control (RRC) message comprising first information used for configuring a Semi-Persistent Scheduling (SPS) physical downlink shared channel (PDSCH) configuration, the receiving circuitry configured to receive a second RRC message comprising second information used for configuring that deferring of SPS hybrid automatic repeat request-acknowledgement (HARQ-ACK) is supported, the receiving circuitry configured to receive a third RRC message comprising third information used for configuring cell switching (based on semi-static configuration and/or dynamic indication), and the receiving circuitry configured to receive, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission; and transmitting circuitry configured to transmit HARQ-ACK information based on a decoding of the SPS PDSCH transmission in a first slot/sub-slot in a first cell, the transmitting circuitry configured to defer the HARQ-ACK information transmission in a second slot/sub-slot in a second cell if cell switching is triggered and the first slot/sub-slot in the first cell is not available.

In one example, a base station (gNB), comprising: transmitting circuitry configured to transmit a first radio resource control (RRC) message comprising first information used for configuring a Semi-Persistent Scheduling (SPS) physical downlink shared channel (PDSCH) configuration, the transmitting circuitry configured to transmit a second RRC message comprising second information used for configuring that deferring of SPS hybrid automatic repeat request-acknowledgement (HARQ-ACK) is supported, the transmitting circuitry configured to transmit a third RRC message comprising third information used for configuring cell switching (based on semi-static configuration and/or dynamic indication), and the transmitting circuitry configured to transmit, based on a transmission of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission; and receiving circuitry configured to receive HARQ-ACK information in a first slot/sub-slot in a first cell, the receiving circuitry configured to receive a deferred HARQ-ACK information transmission in a second slot/sub-slot in a second cell if cell switching is triggered and the first slot/sub-slot in the first cell is not available.

In one example, a method by a user equipment (UE), comprising: receiving a first radio resource control (RRC) message comprising first information used for configuring a Semi-Persistent Scheduling (SPS) physical downlink shared channel (PDSCH) configuration; receiving a second RRC message comprising second information used for configuring that deferring of SPS hybrid automatic repeat request-acknowledgement (HARQ-ACK) is supported; receiving a third RRC message comprising third information used for configuring cell switching (based on semi-static configuration and/or dynamic indication); receiving, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission; transmitting HARQ-ACK information based on a decoding of the SPS PDSCH transmission in a first slot/sub-slot in a first cell; deferring the HARQ-ACK information transmission in a second slot/sub-slot in a second cell if cell switching is triggered and the first slot/sub-slot in the first cell is not available; determining a joint coding for more than two bits of total payload for deferred SPS HARQ-ACK from the first cell and normal HARQ-ACK on a physical uplink control channel (PUCCH) in the second cell; determining a PUCCH resource based on the total HARQ-ACK payload from sets of PUCCH resources; determining a number of physical resource blocks (PRBs) for a PUCCH transmission based on the total HARQ-ACK payload and a maxCodeRate on the selected PUCCH resource; multiplexing the deferred SPS HARQ-ACK and the normal HARQ-ACK based on the determined joint coding; and transmitting the multiplexed HARQ-ACK on the PUCCH; wherein the deferred SPS HARQ-ACK from the first cell and the normal HARQ-ACK in the second cell are concatenated into a single joint HARQ-ACK codebook for the PUCCH transmission; wherein if the total HARQ-ACK payload exceeds a maximum payload size of all configured sets of HARQ-ACK PUCCH resources, the method comprises: transmitting the deferred SPS HARQ-ACK on a normal PUCCH based on a payload of the normal HARQ-ACK; and dropping the normal HARQ-ACK codebook.

DESCRIPTION OF EMBODIMENTS

Figure 1:
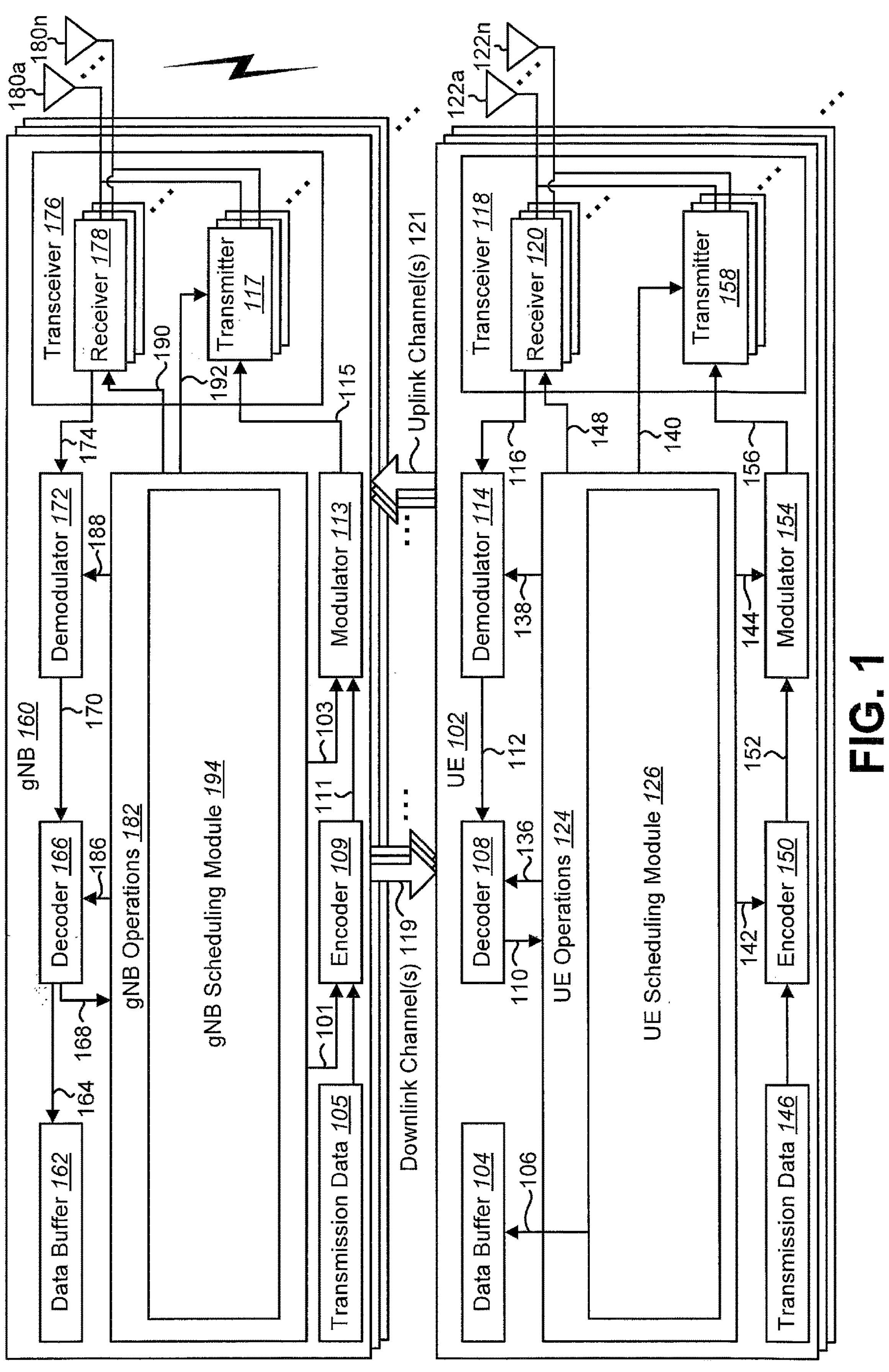
FIG. 1 is a block diagram illustrating one implementation of one or more gNBs and one or more UEs in which systems and methods for joint coding and/or multiplexing of deferred SPS HARQ-ACK may be implemented.

A user equipment (UE) is described. The UE may include receiving circuitry configured to receive a first radio resource control (RRC) message comprising first information used for configuring a Semi-Persistent Scheduling (SPS) physical downlink shared channel (PDSCH) configuration. The receiving circuitry may also be configured to receive a second RRC message comprising second information used for configuring that deferring of SPS hybrid automatic repeat request-acknowledgement (HARQ-ACK) is supported. The receiving circuitry may also be configured to receive a third RRC message comprising third information used for configuring a number of physical uplink control channel (PUCCH) repetitions. The receiving circuitry may also be configured to receive, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The UE may also include transmitting circuitry configured to transmit HARQ-ACK information based on a decoding of the SPS PDSCH transmission in a first set of slots/sub-slots, the HARQ-ACK information being transmitted by the PUCCH repetitions according to the third information. The transmitting circuitry may also be configured to defer the HARQ-ACK information transmission in a second slot/sub-slot (or set of slots/sub-slots) if any slot/sub-slot (or all slots/sub-slots) of the first set of slots/sub-slots is not available.

The UE may include a processor configured to determine a joint coding for more than two bits of total payload for deferred SPS HARQ-ACK and normal HARQ-ACK on a physical uplink control channel (PUCCH). The processor may also be configured to determine a PUCCH resource based on the total HARQ-ACK payload from sets of PUCCH resources. The processor may also be configured to determine a number of physical resource blocks (PRBs) for a PUCCH transmission based on the total HARQ-ACK payload and a maxCodeRate on the selected PUCCH resource. The processor may also be configured to multiplex the deferred SPS HARQ-ACK and the normal HARQ-ACK based on the determined joint coding. The UE may also include transmitting circuitry configured to transmit the multiplexed HARQ-ACK on the PUCCH.

The deferred SPS HARQ-ACK and the normal HARQ-ACK may be concatenated into a single joint HARQ-ACK codebook for the PUCCH transmission.

In some approaches, if the total HARQ-ACK payload exceeds a maximum payload size of all configured sets of HARQ-ACK PUCCH resources, the processor may transmit the deferred SPS HARQ-ACK on a normal PUCCH based on a payload of the normal HARQ-ACK and may drop the normal HARQ-ACK codebook.

In some approaches, if the total HARQ-ACK payload exceeds a maximum payload size of all configured sets of HARQ-ACK PUCCH resources, the processor may perform payload reduction to a deferred SPS HARQ-ACK codebook and may create a new joint HARQ-ACK codebook by appending the payload reduced deferred SPS HARQ-ACK to a normal HARQ-ACK codebook.

In some approaches, if the total HARQ-ACK payload exceeds a maximum payload size of all configured sets of HARQ-ACK PUCCH resources, the processor may perform payload reduction to a normal HARQ-ACK codebook and may create a new joint HARQ-ACK codebook by appending the payload reduced normal HARQ-ACK to a deferred SPS HARQ-ACK codebook.

A base station (gNB) is described. The gNB may include transmitting circuitry configured to transmit a first radio resource control (RRC) message comprising first information used for configuring a Semi-Persistent Scheduling (SPS) physical downlink shared channel (PDSCH) configuration. The transmitting circuitry may also be configured to transmit a second RRC message comprising second information used for configuring that deferring of SPS hybrid automatic repeat request-acknowledgement (HARQ-ACK) is supported. The transmitting circuitry may also be configured to transmit a third RRC message comprising third information used for configuring a number of physical uplink control channel (PUCCH) repetitions. The transmitting circuitry may further be configured to transmit, based on a transmission of a physical downlink control channel (PDCCH) carrying a downlink control information (DCI) format with cyclic redundancy check (CRC) scrambled by a first radio network identifier (e.g., radio network temporary identifier (RNTI)) for an activation of the SPS PDSCH, the SPS PDSCH transmission. The gNB also includes receiving circuitry configured to receive HARQ-ACK information in a first set of slots/sub-slots, the HARQ-ACK information being transmitted by the PUCCH repetitions according to the third information. The receiving circuitry may also be configured to receive a deferred HARQ-ACK information transmission in a second slot/sub-slot (or set of slots/sub-slots) if any slot/sub-slot (or all slots/sub-slots) of the first set of slots/sub-slots is not available.

The gNB may include a processor configured to determine a joint coding for more than two bits of total payload for deferred SPS HARQ-ACK and normal HARQ-ACK on a physical uplink control channel (PUCCH). The processor may also be configured to determine a PUCCH resource based on the total HARQ-ACK payload from sets of PUCCH resources. The processor may also be configured to determine a number of physical resource blocks (PRBs) for a PUCCH transmission based on the total HARQ-ACK payload and a maxCodeRate on the selected PUCCH resource. The gNB may also include receiving circuitry configured to receive multiplexed HARQ-ACK on the PUCCH, the deferred SPS HARQ-ACK and the normal HARQ-ACK being multiplexed based on the determined joint coding.

The deferred SPS HARQ-ACK and the normal HARQ-ACK may be concatenated into a single joint HARQ-ACK codebook for the PUCCH transmission.

In some approaches, if the total HARQ-ACK payload exceeds a maximum payload size of all configured sets of HARQ-ACK PUCCH resources, the processor may receive the deferred SPS HARQ-ACK on a normal PUCCH based on a payload of the normal HARQ-ACK and may drop a normal HARQ-ACK codebook.

In some approaches, if the total HARQ-ACK payload exceeds a maximum payload size of all configured sets of HARQ-ACK PUCCH resources, the processor may perform payload reduction to a deferred SPS HARQ-ACK codebook and may create a new joint HARQ-ACK codebook by appending the payload reduced deferred SPS HARQ-ACK to a normal HARQ-ACK codebook.

In some approaches, if the total HARQ-ACK payload exceeds a maximum payload size of all configured sets of HARQ-ACK PUCCH resources, the processor may perform payload reduction to a normal HARQ-ACK codebook and may create a new joint HARQ-ACK codebook by appending the payload reduced normal HARQ-ACK to a deferred SPS HARQ-ACK codebook.

A method by a user equipment (UE) is described. The method may include receiving a first radio resource control (RRC) message comprising first information used for configuring a Semi-Persistent Scheduling (SPS) physical downlink shared channel (PDSCH) configuration. The method may also include receiving a second RRC message comprising second information used for configuring that deferring of SPS hybrid automatic repeat request-acknowledgement (HARQ-ACK) is supported. The method may also include receiving a third RRC message comprising third information used for configuring a number of physical uplink control channel (PUCCH) repetitions. The method may further include receiving, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The method may further include transmitting HARQ-ACK information based on a decoding of the SPS PDSCH transmission in a first set of slots/sub-slots, the HARQ-ACK information being transmitted by the PUCCH repetitions according to the third information. The method may additionally include deferring the HARQ-ACK information transmission in a second slot/sub-slot (or second set of slots/sub-slots) if any slot/sub-slot (or all slots/sub-slots) of the first set of slots/sub-slots is not available.

The method by the UE may further include determining a joint coding for more than two bits of total payload for deferred SPS HARQ-ACK and normal HARQ-ACK on a physical uplink control channel (PUCCH). The method may also include determining a PUCCH resource based on the total HARQ-ACK payload from sets of PUCCH resources. The method may also include determining a number of physical resource blocks (PRBs) for a PUCCH transmission based on the total HARQ-ACK payload and a maxCodeRate on the selected PUCCH resource. The method may further include multiplexing the deferred SPS HARQ-ACK and the normal HARQ-ACK based on the determined joint coding. The method may additionally include transmitting the multiplexed HARQ-ACK on the PUCCH.

The deferred SPS HARQ-ACK and the normal HARQ-ACK may be concatenated into a single joint HARQ-ACK codebook for the PUCCH transmission.

In some approaches, if the total HARQ-ACK payload exceeds a maximum payload size of all configured sets of HARQ-ACK PUCCH resources, the method may transmit the deferred SPS HARQ-ACK on a normal PUCCH based on a payload of the normal HARQ-ACK, and may drop the normal HARQ-ACK codebook.

In some approaches, if the total HARQ-ACK payload exceeds a maximum payload size of all configured sets of HARQ-ACK PUCCH resources, the method may perform payload reduction to a deferred SPS HARQ-ACK codebook, and may create a new joint HARQ-ACK codebook by appending the payload reduced deferred SPS HARQ-ACK to a normal HARQ-ACK codebook.

In some approaches, if the total HARQ-ACK payload exceeds a maximum payload size of all configured sets of HARQ-ACK PUCCH resources, the method may perform payload reduction to a normal HARQ-ACK codebook, and may create a new joint HARQ-ACK codebook by appending the payload reduced normal HARQ-ACK to a deferred SPS HARQ-ACK codebook.

A method by a base station (gNB) is described. The method may include transmitting a first radio resource control (RRC) message comprising first information used for configuring a Semi-Persistent Scheduling (SPS) physical downlink shared channel (PDSCH) configuration. The method may also include transmitting a second RRC message comprising second information used for configuring that deferring of SPS hybrid automatic repeat request-acknowledgement (HARQ-ACK) is supported. The method may also include transmitting a third RRC message comprising third information used for configuring a number of physical uplink control channel (PUCCH) repetitions. The method may further include transmitting, based on a transmission of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The method may further include receiving HARQ-ACK information in a first set of slots/sub-slots, the HARQ-ACK information being transmitted by the PUCCH repetitions according to the third information. The method may additionally include receiving a deferred HARQ-ACK information transmission in a second slot/sub-slot (or second set of slots/sub-slots) if any slot/sub-slot (or all slots/sub-slots) of the first set of slots/sub-slots is not available.

The method by the gNB may further include determining a joint coding for more than two bits of total payload for deferred SPS HARQ-ACK and normal HARQ-ACK on a physical uplink control channel (PUCCH). The method may also include determining a PUCCH resource based on the total HARQ-ACK payload from sets of PUCCH resources. The method may further include determining a number of physical resource blocks (PRBs) for a PUCCH transmission based on the total HARQ-ACK payload and a maxCodeRate on the selected PUCCH resource. The method may additionally include receiving multiplexed HARQ-ACK on the PUCCH, the deferred SPS HARQ-ACK and the normal HARQ-ACK being multiplexed based on the determined joint coding.

The deferred SPS HARQ-ACK and the normal HARQ-ACK may be concatenated into a single joint HARQ-ACK codebook for the PUCCH transmission.

In some approaches, if the total HARQ-ACK payload exceeds a maximum payload size of all configured sets of HARQ-ACK PUCCH resources, the method may receive the deferred SPS HARQ-ACK on a normal PUCCH based on a payload of the normal HARQ-ACK, and may drop a normal HARQ-ACK codebook.

In some approaches, if the total HARQ-ACK payload exceeds a maximum payload size of all configured sets of HARQ-ACK PUCCH resources, the method may perform payload reduction to a deferred SPS HARQ-ACK codebook, and may create a new joint HARQ-ACK codebook by appending the payload reduced deferred SPS HARQ-ACK to a normal HARQ-ACK codebook.

In some approaches, if the total HARQ-ACK payload exceeds a maximum payload size of all configured sets of HARQ-ACK PUCCH resources, the method may perform payload reduction to a normal HARQ-ACK codebook, and may create a new joint HARQ-ACK codebook by appending the payload reduced normal HARQ-ACK to a deferred SPS HARQ-ACK codebook.

Another user equipment (UE) is described. The UE may include receiving circuitry configured to receive a first radio resource control (RRC) message comprising first information used for configuring a Semi-Persistent Scheduling (SPS) physical downlink shared channel (PDSCH) configuration. The receiving circuitry may also be configured to receive a second RRC message comprising second information used for configuring that deferring of SPS hybrid automatic repeat request-acknowledgement (HARQ-ACK) is supported. The receiving circuitry may also be configured to receive a third RRC message comprising third information used for configuring cell switching (based on semi-static configuration and/or dynamic indication). The receiving circuitry may additionally be configured to receive, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The UE may also include transmitting circuitry configured to transmit HARQ-ACK information based on a decoding of the SPS PDSCH transmission in a first slot/sub-slot in a first cell. The transmitting circuitry may further be configured to defer the HARQ-ACK information transmission in a second slot/sub-slot in a second cell if cell switching is triggered and the first slot/sub-slot in the first cell is not available.

The UE may include a processor configured to determine a joint coding for more than two bits of total payload for deferred SPS HARQ-ACK from the first cell and normal HARQ-ACK on a physical uplink control channel (PUCCH) in the second cell. The processor may also be configured to determine a PUCCH resource based on the total HARQ-ACK payload from sets of PUCCH resources. The processor may also be configured to determine a number of physical resource blocks (PRBs) for a PUCCH transmission based on the total HARQ-ACK payload and a maxCodeRate on the selected PUCCH resource. The processor may also be configured to multiplex the deferred SPS HARQ-ACK and the normal HARQ-ACK based on the determined joint coding. The UE may also include transmitting circuitry is configured to transmit the multiplexed HARQ-ACK on the PUCCH.

The deferred SPS HARQ-ACK from the first cell and the normal HARQ-ACK in the second cell may be concatenated into a single joint HARQ-ACK codebook for the PUCCH transmission.

Another base station (gNB) is described. The gNB may include transmitting circuitry configured to transmit a first radio resource control (RRC) message comprising first information used for configuring a Semi-Persistent Scheduling (SPS) physical downlink shared channel (PDSCH) configuration. The transmitting circuitry may also be configured to transmit a second RRC message comprising second information used for configuring that deferring of SPS hybrid automatic repeat request-acknowledgement (HARQ-ACK) is supported. The transmitting circuitry may also be configured to transmit a third RRC message comprising third information used for configuring cell switching (based on semi-static configuration and/or dynamic indication). The transmitting circuitry may further be configured to transmit, based on a transmission of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The gNB may also include receiving circuitry configured to receive HARQ-ACK information in a first slot/sub-slot in a first cell. The receiving circuitry may also be configured to receive a deferred HARQ-ACK information transmission in a second slot/sub-slot in a second cell if cell switching is triggered and the first slot/sub-slot in the first cell is not available.

The gNB may include a processor configured to determine a joint coding for more than two bits of total payload for deferred SPS HARQ-ACK from the first cell and normal HARQ-ACK on a physical uplink control channel (PUCCH) in the second cell. The processor may also be configured to determine a PUCCH resource based on the total HARQ-ACK payload from sets of PUCCH resources. The processor may also be configured to determine a number of physical resource blocks (PRBs) for a PUCCH transmission based on the total HARQ-ACK payload and a maxCodeRate on the selected PUCCH resource. The gNB may also include receiving circuitry is configured to receive multiplexed HARQ-ACK on the PUCCH, the deferred SPS HARQ-ACK and the normal HARQ-ACK being multiplexed based on the determined joint coding.

The deferred SPS HARQ-ACK from the first cell and the normal HARQ-ACK in the second cell may be concatenated into a single joint HARQ-ACK codebook for the PUCCH transmission.

Another method by a user equipment (UE) is described. The method may include receiving a first radio resource control (RRC) message comprising first information used for configuring a Semi-Persistent Scheduling (SPS) physical downlink shared channel (PDSCH) configuration. The method may also include receiving a second RRC message comprising second information used for configuring that deferring of SPS hybrid automatic repeat request-acknowledgement (HARQ-ACK) is supported. The method may further include receiving a third RRC message comprising third information used for configuring cell switching (based on semi-static configuration and/or dynamic indication). The method may additionally include receiving, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The method may also include transmitting HARQ-ACK information based on a decoding of the SPS PDSCH transmission in a first slot/sub-slot in a first cell. The method may additionally include deferring the HARQ-ACK information transmission in a second slot/sub-slot in a second cell if cell switching is triggered and the first slot/sub-slot in the first cell is not available.

The method by the UE may also include determining a joint coding for more than two bits of total payload for deferred SPS HARQ-ACK from the first cell and normal HARQ-ACK on a physical uplink control channel (PUCCH) in the second cell. The method may also include determining a PUCCH resource based on the total HARQ-ACK payload from sets of PUCCH resources. The method may further include determining a number of physical resource blocks (PRBs) for a PUCCH transmission based on the total HARQ-ACK payload and a maxCodeRate on the selected PUCCH resource. The method may also include multiplexing the deferred SPS HARQ-ACK and the normal HARQ-ACK based on the determined joint coding. The method may additionally include transmitting the multiplexed HARQ-ACK on the PUCCH.

The deferred SPS HARQ-ACK from the first cell and the normal HARQ-ACK in the second cell may be concatenated into a single joint HARQ-ACK codebook for the PUCCH transmission.

Another method by a base station (gNB) is described. The method may include transmitting a first radio resource control (RRC) message comprising first information used for configuring a Semi-Persistent Scheduling (SPS) physical downlink shared channel (PDSCH) configuration. The method may also include transmitting a second RRC message comprising second information used for configuring that deferring of SPS hybrid automatic repeat request-acknowledgement (HARQ-ACK) is supported. The method may also include transmitting a third RRC message comprising third information used for configuring cell switching (based on semi-static configuration and/or dynamic indication). The method may further include transmitting, based on a transmission of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission. The method may further include receiving HARQ-ACK information in a first slot/sub-slot in a first cell. The method may additionally include receiving a deferred HARQ-ACK information transmission in a second slot/sub-slot in a second cell if cell switching is triggered and the first slot/sub-slot in of the first cell is not available.

The method by the gNB may also include determining a joint coding for more than two bits of total payload for deferred SPS HARQ-ACK from the first cell and normal HARQ-ACK on a physical uplink control channel (PUCCH) in the second cell. The method may also include determining a PUCCH resource based on the total HARQ-ACK payload from sets of PUCCH resources. The method may also include determining a number of physical resource blocks (PRBs) for a PUCCH transmission based on the total HARQ-ACK payload and a maxCodeRate on the selected PUCCH resource. The method may further include receiving multiplexed HARQ-ACK on the PUCCH, the deferred SPS HARQ-ACK and the normal HARQ-ACK being multiplexed based on the determined joint coding.

The deferred SPS HARQ-ACK from the first cell and the normal HARQ-ACK in the second cell may be concatenated into a single joint HARQ-ACK codebook for the PUCCH transmission.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In 5G NR, different services may be supported with different QoS requirements (e.g., reliability and/or delay tolerance). For example, eMBB is targeted for high data rate, and URLLC is targeted for ultra-reliability and low latency. To support ultra-low latency, more than one HARQ-ACK feedback in a slot may be configured for URLLC services. In some approaches, two or more HARQ-ACK codebooks may be simultaneously constructed for different service types. The PUCCH for URLLC HARQ-ACK may be used to transmit HARQ-ACK in a sub-slot level. Furthermore, the PUCCH for URLLC HARQ-ACK may be enhanced with ultra-reliability (e.g., with BLER of $10^{6}$ instead of a$0^{2}$. Some of the techniques described herein may include some aspects of SPS HARQ-ACK deferral, available PUCCH resource determination, and/or priority determination for deferred SPS HARQ-ACK, etc.

From a UCI multiplexing point of view, the HARQ-ACK is one UCI type (e.g., it may or may not be necessary to differentiate between SPS HARQ-ACK and non-SPS HARQ-ACK in some approaches). Some of the examples described herein may include up to 2 bits of HARQ-ACK reporting using bundling, etc. In some examples, UCI multiplexing may be utilized for more than 2 bits of total payload. Some examples of the techniques described herein may be utilized for PUCCH format 2/3/4 cases. In some approaches, joint coding and/or separate coding may be supported.

Some examples of the techniques described herein may support cases such as deferred SPS HARQ-ACK and non-deferred HARQ-ACK with the same priority. Some examples of the techniques described herein may include similar behaviors for UCI multiplexing. For example, multiplexing of different UCI of the same priority may be enabled for low priority (LP) HARQ-ACK, LP SR, and CSI, and for high priority (HP) HARQ-ACK with HP SR. Other cases for UCI multiplexing may include HP HARQ-ACK with LP HARQ-ACK, HP HARQ-ACK with HP SR and with LP HARQ-ACK, and HP SR with LP HARQ-ACK.

Deferred and non-deferred HARQ-ACKs with the same priority in the same slot/sub-slot is an issue. In some examples of the techniques described herein, for codebook generation, the SPS and normal HARQ-ACK may be multiplexed in the same HARQ-ACK codebook if their timings point to the same slot/sub-slot. In some examples, deferred SPS HARQ-ACK may have a different timing indication, may be postponed, and/or may be addressed with a separate codebook (e.g., basically a separate codebook). In some examples, two codebooks with the same priority may be maintained at the same time. In some examples, multiplexing may be considered as maintaining one codebook (e.g., only one codebook).

In NR release-17, HARQ-ACK multiplexing with different priorities on PUCCH may be supported. Both joint coding and separate coding methods may be taken into account. Some examples of joint coding methods for multiplexing of HARQ-ACK with different priorities are discussed. For example, when the payload size is small, joint coding may be performed.

In a first aspect, methods are described for HARQ-ACK multiplexing when the number of HARQ-ACK is no more than 2 bits for both high priority HARQ-ACK and low priority HARQ-ACK. In this case, it may be desirable to keep sequence based PUCCH format 0 or PUCCH format 1 for its reliability and resource efficiency.

In a second aspect, joint coding methods are described when the high priority HARQ-ACK and low priority HARQ-ACK are concatenated into a single joint HARQ-ACK coding book for PUCCH transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for joint coding and/or multiplexing of deferred SPS HARQ-ACK may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint coding and/or multiplexing of deferred SPS HARQ-ACK as described herein. For instance, the UE 102, the UE operations module 124, and/or the UE scheduling module 126 may perform one or more of the methods (e.g., method 1200 described in relation to FIG. 12, etc.), operations, functions, approaches, and/or examples described herein.

Details of joint coding and/or multiplexing of deferred SPS HARQ-ACK are discussed herein. In some examples, support of multiplexing of HARQ-ACK with different priorities is described. In some examples, a PUSCH or a PUCCH, including repetitions if any, can be of priority index 0 or of priority index 1. In some examples, if a priority index is not provided for a PUSCH or a PUCCH, the priority index is 0.

A high priority UCI may be a high priority HARQ-ACK or a high priority SR. The priority of a SR can be indicated in a SR configuration by higher layer signaling. A high priority HARQ-ACK corresponds to a high priority PDSCH transmission. The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, HARQ-ACK, or PUCCH resource may be configured to support URLLC services. The high priority may be configured with a priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, HARQ-ACK, or PUCCH resource may be configured to support eMBB services. The low priority may be configured with a priority index 0.

In some approaches, UCI multiplexing on PUCCH may be supported only for UCIs with the same priority. As enhancements of HARQ-ACK reporting with different priorities, multiplexing of UCI between different priorities can be supported by high layer signaling under some timing restrictions. For example, multiplexing of the same UCI type on a single PUCCH may be supported (e.g., URLLC HARQ-ACK and eMBB HARQ-ACK). In an example, if the low priority PUCCH carrying low priority HARQ-ACK can be fully dropped by the high priority PUCCH carrying high priority HARQ-ACK, multiplexing of HARQ-ACK with different priorities on a single PUCCH may be supported. Otherwise, the low priority PUCCH carrying low priority HARQ-ACK may be dropped and the high priority PUCCH carrying high priority HARQ-ACK is transmitted. Some of the techniques described herein may help to prevent and/or avoid dropping SPS HARQ-ACK for TDD operation.

In some examples, joint coding for multiplexing of HARQ-ACK with different priorities is described herein. If multiplexing of HARQ-ACK with different priorities on a PUCCH is supported, joint coding may be supported. With some examples of joint coding, the HARQ-ACK bits of different priorities may be concatenated into a single codebook, and the joint codebook is encoded and rate matched based on the maximum coding rate of the URLLC PUCCH configuration, and then transmitted on a selected URLLC PUCCH resource.

The PUCCH resource for HARQ-ACK multiplexing of different priorities may be a PUCCH resource configured for the high priority HARQ-ACK codebook (e.g., HARQ-ACK codebook with priority index 1). A UE may be configured by maxCodeRate a code rate multiplexing HARQ-ACK of different priorities in a PUCCH transmission using PUCCH format 2, PUCCH format 3, or PUCCH format 4 configured for high priority HARQ-ACK codebook.

In some examples, joint coding may apply only one channel coding process and may be simpler to implement. This may be a priority inheritance mechanism. When low priority UCI is multiplexed with high priority UCI, the channel coding and error protection for the low priority UCI may be promoted, evaluated and/or inherited from the high priority UCI. For UCI multiplexing between different priorities, the low priority UCI may be provided with the same reliability and error protection as the high priority UCI. On the other hand, the PUCCH resource utilization may be low because all bits are coded together, and the coded bits are rate matched with ultra-reliability requirements following the maximum coding rate configured for the high priority PUCCH.

Joint coding may provide some benefits. For example, joint coding may provide validation by CRC for a codebook with up to 11 bits when the total payload is greater than 11 bits. Joint coding may reduce overhead with one CRC instead of two CRCs. Joint coding may provide higher coding gain (e.g., larger payload by polar code vs. smaller payload by RM code).

For a HARQ-ACK reporting, the PUCCH may be selected based on a maximum payload size configured for a set of PUCCH resources in some examples. A UE may be configured with up to 4 sets of PUCCH resources with different maximum payload sizes. Within each set, the maximum coding rate may satisfy the maximum payload configured for the given set of PUCCH resources. Also, the actual PUCCH transmission may not need to use all configured number of Physical Resource Blocks (PRBs). The PUCCH transmission may use the minimum number of PRBs that can satisfy the maximum code rate for the reported UCI payload.

With joint coding of HARQ-ACK with different priorities, the selected PUCCH format and resource may be determined based on the total payload size of high priority HARQ-ACK and low priority HARQ-ACK. The detailed HARQ-ACK multiplexing method may be specified based on different payload ranges. For example, a HARQ-ACK multiplexing method may be specified when both high priority HARQ-ACK and low priority HARQ-ACK are less than or equal to 2 bits.

Examples of multiplexing of HARQ-ACK with different priorities on PUCCH for up to 2 bits HARQ-ACK codebooks are now described. For up to 2 bits of UCI reporting on PUCCH, a sequence based PUCCH format 0 or PUCCH format 1 may be used. Compared with other PUCCH formats with larger payload size, sequence based PUCCH format 0/1 may be more reliable with less resource utilization. Therefore, it is desirable to use PUCCH format 0 or PUCCH format 1 when possible, especially when the HARQ-ACK bits of each priority index is no more than 2 bits.

In NR, the number of codewords per PDSCH assignment per UE may be limited to one codeword for 1 to 4-layer transmission, and 2 codewords for 5 to 8-layer transmission. In the case of one codeword in a PDSCH, one TB level HARQ-ACK bit may be generated corresponding to the PDSCH. In the case of 2 codewords in a PDSCH, 2 TB level HARQ-ACK bits may be generated for the PDSCH. Therefore, for eMBB service, a PDSCH with 2 codeword may be more likely. For URLLC, due to ultra-reliability requirements, one codeword may be more practical.

Several methods can be utilized for reporting of up to 2 bits of HARQ-ACK for both high priority and low priority.

In a first method (Method 1), PUCCH format 0 and 1 may always be used on the high priority HARQ-ACK PUCCH resource. In this method, PUCCH format 0/1 may always be used for HARQ-ACK multiplexing with different priorities if both high priority HARQ-ACK and low priority HARQ-ACK are up to 2 bits. The original high priority HARQ-ACK PUCCH resource may be used for the joint HARQ-ACK reporting.

In a first approach (Approach 1) of Method 1, HARQ-ACK multiplexing with bundling may be applied within the same priority. In this approach, HARQ-ACK bundling may be applied in case of 2 bits of HARQ-ACK in a codebook so that the total number of HARQ-ACK bits is kept as 2 bits.

For multiplexing of 1 bit of high priority HARQ-ACK and 1 bit of low priority HARQ-ACK, the low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 1 bit of high priority HARQ-ACK and 2 bits of low priority HARQ-ACK, the 2 bits of low priority HARQ-ACK can be bundled into 1 bit first by an AND function. Thus, the bits 00, 01, and 10 may be bundled as 0, and bits 11 may be bundled as 1. The bundled low priority HARQ-ACK bit may then be appended to the high priority HARQ-ACK. The joint HARQ-ACK may have 2 bits and may be reported on a high priority PUCCH resource with PUCCH format 0 or format 1.

For multiplexing of 2 bits of high priority HARQ-ACK and 1 bit of low priority HARQ-ACK, the 2 bits of high priority HARQ-ACK can be bundled into 1 bit first by an AND function. The low priority HARQ-ACK bit may then be appended to the bundled high priority HARQ-ACK. The joint HARQ-ACK may have 2 bits and may be reported on a high priority PUCCH resource with PUCCH format 0 or format 1.

For multiplexing of 2 bits of high priority HARQ-ACK and 2 bits of low priority HARQ-ACK, the 2 bits of high priority HARQ-ACK can be bundled into 1 bit by an AND function. And the 2 bits of low priority HARQ-ACK may be bundled into 1 bit by an AND function. The bundled low priority HARQ-ACK bit may then be appended to the bundled high priority HARQ-ACK. The joint HARQ-ACK may have 2 bits and may be reported on a high priority PUCCH resource with PUCCH format 0 or format 1.

The joint HARQ-ACK may be reported on a high priority PUCCH resource, so the HARQ-ACK report reliability is not an issue. The issue with HARQ-ACK bundling may be a loss of information.

For low priority HARQ-ACK for eMBB PDSCH transmissions, the initial transmission NACK probability may be around 10%. In the case of two TBs in a PDSCH, HARQ-ACK bits of “01”, “10” and “00” may all be reported as NACK. Thus, the NACK probability after bundling becomes approximately 20%, which may cause more unnecessary TB retransmissions. However, compared with URLLC PDSCH, eMBB PDSCH is more spectrum efficient with higher FER target and HARQ with soft combining of re-transmissions.

For high priority HARQ-ACK for URLLC PDSCH transmissions, the initial transmission NACK probability may be targeted at $10^{-5}$ or $10^{-6}$, which may be much lower than that of an eMBB PDSCH. Thus, the PDSCH for URLLC may use conservative MCS and much lower coding rate to achieve this target. In the case of two TBs in a high priority PDSCH, HARQ-ACK bits of "01", "10" and "00" may all be reported as NACK. Thus, the NACK probability after bundling becomes 2 times of the target rate at $10^{-5}$ or $10^{-6}$, which is still very low. Thus, the impact of HARQ-ACK bundling of the high priority HARQ-ACK is much smaller than the impact of bundling of low priority HARQ-ACK. Furthermore, since 2 codewords may be supported only for 5-8 layers of MIMO transmissions, due to ultra-reliability requirements, one codeword is more likely for URLLC PDSCH transmissions.

In a second approach (Approach 2) of Method 1, HARQ-ACK multiplexing with bundling may be applied across different priorities (referred to herein as cross priority HARQ-ACK bundling). The above Approach 1 limits HARQ-ACK bundling within the same priority. Alternatively, HARQ-ACK bundling may be performed between HARQ-ACK bits of high priority and low priority. For example, considering the URLLC NACK probability is ultra-low, the ACK reported in the majority of cases may be 99.9999%. A bundle between a high priority HARQ-ACK bit and a low priority HARQ-ACK bit may result in the same value as the low priority HARQ-ACK bit. With this assumption, the alternative approaches can be utilized as follows.

For multiplexing of 1 bit of high priority HARQ-ACK and 1 bit of low priority HARQ-ACK, the low priority HARQ-ACK can be appended to the high priority HARQ-ACK to generate a joint 2 bits HARQ-ACK.

For multiplexing of 1 bit of high priority HARQ-ACK and 2 bits of low priority HARQ-ACK, the 1 bit high priority HARQ-ACK may be bundled into the first bit of low priority HARQ-ACK. The second bit of low priority HARQ-ACK may then be appended. Alternatively, the 1 bit high priority HARQ-ACK may be bundled into the second bit of low priority HARQ-ACK. The bundled bit may then be appended to the first bit of low priority HARQ-ACK.

For multiplexing of 2 bits of high priority HARQ-ACK and 1 bit of low priority HARQ-ACK, the 1 bit low priority HARQ-ACK may be bundled into the first bit of high priority HARQ-ACK. The second bit of high priority HARQ-ACK may then be appended. Alternatively, the 1 bit low priority HARQ-ACK may be bundled into the second bit of low priority HARQ-ACK. The bundled bit may then be appended to the first bit of high priority HARQ-ACK.

For multiplexing of 2 bits of high priority HARQ-ACK and 2 bits of low priority HARQ-ACK, the first bit of high priority HARQ-ACK and the first bit of low priority HARQ-ACK may be bundled into a bundled first bit. The second bit of high priority HARQ-ACK and the second bit of low priority HARQ-ACK may be bundled into a second bundled bit. The first bundle bit and the second bundled bit may be concatenated into 2 bits.

In all cases, the resulting 2 bits of HARQ-ACK may be reported on the high priority HARQ-ACK PUCCH resource with PUCCH format 0 or PUCCH format 1. With cross priority HARQ-ACK bundling, the drawback is that a NACK from a low priority HARQ-ACK bit may cause a NACK report for the high priority HARQ-ACK bit.

In a third approach (Approach 3) of Method 1, HARQ-ACK bundling is allowed between different priorities with high priority NACK overwriting. In this approach, HARQ-ACK bundling may be applied between high priority and low priority HARQ-ACK bits if there are 2 bits of HARQ-ACK in a codebook. But the total number of HARQ-ACK bits after bundling may be kept as 2 bits.

In some cases, bundling between HARQ-ACK with different priorities may not be helpful due to very different target error rate for PDSCH transmissions. If a high priority HARQ-ACK and a low priority HARQ-ACK are bundled together, the bundled bit may have roughly 10% NACK probability. Although ACK to NACK error does not lose data, it may still be too high for URLLC services.

However, since URLLC NACK probability is ultra-low, ACK reported in the majority of cases may be 99.9999%. Therefore, in case of 2 bits of low priority HARQ-ACK bits, the low priority HARQ-ACK bits can be reported on the high priority PUCCH resource assuming an ACK is reported for URLLC. In the case that at least a NACK is reported for high priority HARQ-ACK, the UE may report all NACKs (e.g., "00" on the high priority PUCCH resource). Thus, a NACK of the high priority HARQ-ACK may overwrite the low priority HARQ-ACK.

For multiplexing of 1 bit of high priority HARQ-ACK and 1 bit of low priority HARQ-ACK, this may be the same as Approach 1. The low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 2 bits of high priority HARQ-ACK and 1 bit of low priority HARQ-ACK, this may be the same as Approach 1. The 2 bits of high priority HARQ-ACK can be bundled into 1 bit first by an AND function. The low priority HARQ-ACK bit may then be appended to the bundled high priority HARQ-ACK. The joint HARQ-ACK may have 2 bits and may be reported on a high priority PUCCH resource with PUCCH format 0 or format 1.

If the new approach is applied for multiplexing of 2 bits of high priority HARQ-ACK and 1 bit of low priority HARQ-ACK, then if the high priority HARQ-ACK is all ACKs (e.g., "11" for the two HARQ-ACK bits), then 1 bit of low priority HARQ-ACK may be reported on the high priority PUCCH resource.

If the high priority HARQ-ACK has at least a NACK (e.g., "01", "10" or "11" for the two HARQ-ACK bits), then the UE may report all NACKs (e.g., "00") on the high priority PUCCH resource. The 1 bit of low priority HARQ-ACK may be overwritten by the high priority NACK. With this approach, an all-NACK (e.g., "00") report may indicate a NACK for high priority HARQ-ACK or a NACK for the low priority HARQ-ACK even if there are all ACKs for the high priority HARQ-ACK. The high priority ACK to NACK error report probability may be approximately 10% with 1 bit of low priority HARQ-ACK. This may be too high for the high priority HARQ-ACK.

For multiplexing of 1 bit of high priority HARQ-ACK and 2 bits of low priority HARQ-ACK, if the high priority HARQ-ACK is an ACK, the 2 bits of low priority HARQ-ACK may be reported on the high priority PUCCH resource. If the high priority HARQ-ACK is a NACK, then the UE may report all NACKs (e.g., "00") on the high priority PUCCH resource. The 2 bits of low priority HARQ-ACK may be overwritten by the high priority NACK.

For multiplexing of 2 bits of high priority HARQ-ACK and 2 bits of low priority HARQ-ACK, if the high priority HARQ-ACK is all ACKs (e.g., "11") for the two HARQ- ACK bits, the 2 bits of low priority HARQ-ACK are reported on the high priority PUCCH resource. If the high priority HARQ-ACK has at least a NACK (e.g., "01", "10" or "11") for the two HARQ-ACK bits, then the UE should report all NACKs (e.g., "00") on the high priority PUCCH resource. The 2 bits of low priority HARQ-ACK may be overwritten by the high priority NACK.

Thus, an all-NACK (e.g., "00") report may indicate a NACK for high priority HARQ-ACK or all NACKs for the low priority HARQ-ACK even if all ACKs for the high priority HARQ-ACK. The high priority ACK to NACK error report probability may be approximately 1% when 2 bits of eMBB are all NACK each with a 10% NACK probability. The miss-reporting of low priority ACK to NACK error may be almost avoided for 01 and 10 cases, and the probability of low priority "11" to "00" by URLLC NACK may be negligible at the order of $10^{-5}$. This approach may ensure no information loss for the low priority HARQ-ACK with minimized impact on the low priority HARQ-ACK.

le;.3qIn a fourth approach (Approach 4) of Method 1, for PUCCH format 0, HARQ-ACK bundling may be applied for low priority HARQ-ACK, and cyclic shift values may be used to represent low priority HARQ-ACK. The HARQ-ACK bundling reduces the HARQ-ACK granularity. This may not be desirable at least for high priority HARQ-ACK bits. Thus, in another approach, if the PUCCH format 0 may be used to carry the high priority HARQ-ACK bits, bundling of high priority HARQ-ACK bits may not be used. The high priority HARQ-ACK may be reported on the original PUCCH resource, the low priority HARQ-ACK may be represented by applying the same cyclic shift or a different cyclic shift on the sequence and cyclic shift determined by the high priority HARQ-ACK information bits.

With this approach, only 1 bit of low priority HARQ-ACK bit may be reported. In the case of 2 bits of low priority HARQ-ACK, the low priority HARQ-ACK may be bundled to 1 bit by an AND function. Thus, the low priority HARQ-ACK bits of 00, 01, and 10 may be bundled as 0, and bits 11 may be bundled as 1.

If a UE transmits a PUCCH with HARQ-ACK information using PUCCH format 0, the UE may determine values $m_O$ and $m_{CS}$ for computing a value of cyclic shift a where $m_O$ may be provided by initialCyclicShift of PUCCH-format0 or, if initialCyclicShift may not be provided, by the initial cyclic shift index, and $m_{CS}$ may be determined from the value of one HARQ-ACK information bit or from the values of two HARQ-ACK information bits.

In the case of multiplexing of up to 2 bits of HARQ-ACK with priority index 1 and up to 2 bits of HARQ-ACK with priority index 0 on a PUCCH format 0 configured for the HARQ-ACK with priority index 1, the high priority HARQ-ACK bits may be represented by a cyclic shift on the sequence based on the UCI bits, and the low priority HARQ-ACK bits may be represented by applying the same or a different cyclic shift over the high priority HARQ-ACK bits. The additional cyclic shift value may be determined by the low priority HARQ-ACK value.

In some methods, in the case of one bit of low priority HARQ-ACK bit with an ACK or "1", or two bits of low priority HARQ-ACK bit with an all ACKs or "11", the cyclic shift of the high priority HARQ-ACK bits may be kept the same. In the case of one bit of low priority HARQ-ACK bit with a NACK or "0", or two bits of low priority HARQ-ACK bit with at least a NACK, i.e. "01", "10" or "00", a different cyclic shift from the high priority HARQ-ACK bits may be used. Examples of cyclic shifts for different HARQ-ACK bits combinations are given in tables below. Table-1 illustrates an example for mapping of values for one high priority HARQ-ACK information bit and one or two low priority HARQ-ACK information bits to sequences for PUCCH format 0. Table-2 illustrates an example for mapping of values for two high priority HARQ-ACK information bits and one or two low priority HARQ-ACK information bits to sequences for PUCCH format 0.

TABLE 1

| | High priority HARQ-ACK value | | | |
|---|---|---|---|---|
| | 0 | | 1 | |
| Low priority HARQ-ACK value | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits |
| Sequence cyclic shift | $m_{cs} = 0$ | $m_{cs} = 3$ | $m_{cs} = 6$ | $m_{cs} = 9$ |

TABLE 2

| | High priority HARQ-ACK value | | | | | | | |
|---|---|---|---|---|---|---|---|---|
| | {0, 0} | | {0, 1} | | {1, 1} | | {1, 0} | |
| Low priority HARQ-ACK value | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits |
| Sequence cyclic shift | $m_{cs} = 0$ | $m_{cs} = 1$ | $m_{cs} = 3$ | $m_{cs} = 4$ | $m_{cs} = 6$ | $m_{cs} = 7$ | $m_{cs} = 9$ | $m_{cs} = 10$ |

In another implementation, the opposite may apply. Thus, in the case of one bit of low priority HARQ-ACK bit with an NACK or “0”, or two bits of low priority HARQ-ACK bit with at least a NACK (e.g., “01”, “10” or “00”), the cyclic shift of the high priority HARQ-ACK bits may be kept the same. In the case of one bit of low priority HARQ-ACK bit with an ACK or “1”, or two bits of low priority HARQ-ACK bit with an all ACKs or “11”, a different cyclic shift from the high priority HARQ-ACK bits may be used. The cyclic shifts for different HARQ-ACK bits combinations are given in the tables below. Table-3 illustrates an example for mapping of values for one high priority HARQ-ACK information bit and one or two low priority HARQ-ACK information bits to sequences for PUCCH format 0. Table-4 illustrates an example for mapping of values for two high priority HARQ-ACK information bits and one or two low priority HARQ-ACK information bit to sequences for PUCCH format 0.

TABLE 3

| | High priority HARQ-ACK | | | |
|---|---|---|---|---|
| | 0 | | 1 | |
| Low priority HARQ-ACK | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{cs} = 0$ | $m_{cs} = 3$ | $m_{cs} = 6$ | $m_{cs} = 9$ |

TABLE 4

| | High priority HARQ-ACK | | | | | | | |
|---|---|---|---|---|---|---|---|---|
| | {0, 0} | | {0, 1} | | {1, 1} | | {1, 0} | |
| Low priority HARQ-ACK | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{cs} = 0$ | $m_{cs} = 1$ | $m_{cs} = 3$ | $m_{cs} = 4$ | $m_{cs} = 6$ | $m_{cs} = 7$ | $m_{cs} = 9$ | $m_{cs} = 10$ |

In a second method (Method 2), different high priority PUCCH formats and resources may be used based on total HARQ-ACK payload. In this method, the number of high priority HARQ-ACK bits may not be bundled, and one bit of HARQ-ACK can be multiplexed as it is. The total payload may have different variations based on the combinations of number of bits for the HARQ-ACK codebooks, and different PUCCH resources with different PUCCH formats may be used for the HARQ-ACK multiplexing.

For multiplexing of 1 bit of high priority HARQ-ACK and 1 bit of low priority HARQ-ACK, the low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 1 bit of high priority HARQ-ACK and 2 bits of low priority HARQ-ACK, some approaches can be utilized. In one approach, the 2 bits of low priority HARQ-ACK may be bundled into 1 bit, the bundled low priority HARQ-ACK bit can be appended to the high priority HARQ-ACK. The joint HARQ-ACK may have 2 bits and may be reported on a high priority PUCCH resource with PUCCH format 0 or PUCCH format 1. In another approach, the 2 bits of low priority HARQ-ACK can be appended to the high priority HARQ-ACK. The joint HARQ-ACK has more than 2 bits and may be reported on a high priority PUCCH resource with PUCCH format 2 or PUCCH format 3 or PUCCH format 4.

For multiplexing of 2 bits of high priority HARQ-ACK and 1 bit or 2 bits of low priority HARQ-ACK, the low priority HARQ-ACK can be appended to the high priority HARQ-ACK. The joint HARQ-ACK has more than 2 bits and may be reported on a high priority PUCCH resource with PUCCH format 2 or PUCCH format 3 or PUCCH format 4.

In a third method (Method 3), 2 bits for each HARQ-ACK priority may always be assumed and multiplexed on a high priority HARQ-ACK PUCCH resource with PUCCH format 2/3/4. In this method, the PUCCH resource carrying the multiplexed HARQ-ACK codebooks may be always a high priority HARQ-ACK PUCCH resource used with PUCCH format 2 or PUCCH format 3 or PUCCH format 4 carrying more than 2 bits. Thus, in the case of 1 or 2 bits of HARQ-ACK, the UE may always assume 2 bits when HARQ-ACK multiplexing between different priorities may be performed. In the case of 1 bit of HARQ-ACK in a codebook, the HARQ-ACK information bit may be repeated to generate two bits (e.g., a bit of “0” may be reported with “00”, and a bit of “1” may be reported with “11”). This ensures the total payload may be more than 2 bits.

The concatenated HARQ-ACK bits may then be encoded and transmitted on a high priority HARQ-ACK PUCCH resource with PUCCH format 2 or PUCCH format 3 or PUCCH format 4. This provides a unified solution for multiplexing of HARQ-ACK with different priorities regardless of the HARQ-ACK codebook sizes.

In a fourth method (Method 4), joint HARQ-ACK multiplexing and reporting may be performed with PUCCH channel selection. In the methods above, the PUCCH resource for high priority HARQ-ACK may be used to report the multiplexed HARQ-ACK bits with different priorities with bundling as necessary. In another method, since there are PUCCH resources for both high priority and low priority HARQ-ACK, PUCCH channel selection can be used to carry extra information for HARQ-ACK multiplexing.

As discussed above, for high priority HARQ-ACK, the NACK probability even after HARQ-ACK bundling becomes 2 times the target rate at $10^{-5}$ or $10^{-6}$, which may be still very low. Thus, the impact of HARQ-ACK bundling of the high priority HARQ-ACK may be very small. URLLC NACK probability may be ultra-low, and the ACK reported in the majority of cases may be 99.9999%.

To explore the ultra-reliability of URLLC traffic, in this method, in case of all ACKs for the high priority HARQ-ACK, high priority HARQ-ACK PUCCH resource may be used to report 1 or 2 bits of low priority HARQ-ACK, i.e. one or two bits the eMBB HARQ-ACK bits are reported on the URLLC PUCCH resource. If there may be at least a NACK for the high priority HARQ-ACK, the high priority HARQ-ACK PUCCH may not be transmitted. The low priority HARQ-ACK may be reported on the low priority HARQ-ACK PUCCH resource. Since the high priority PUCCH may not be transmitted, the gNB may not detect the high priority PUCCH transmission, and may treat it as a DTX, where a DTX may be equivalent to NACK in HARQ-ACK reporting.

For multiplexing of 1 bit of high priority HARQ-ACK and 1 bit or 2 bits of low priority HARQ-ACK, with an ACK feedback of the high priority HARQ-ACK, the 1 bit or 2 bits of low priority HARQ-ACK may be reported on the high priority PUCCH resource. With a NACK feedback of the high priority HARQ-ACK, the 1 bit or 2 bits of low priority HARQ-ACK may be reported on the low priority PUCCH resource.

For multiplexing of 2 bits of high priority HARQ-ACK and 1 bit or 2 bits of low priority HARQ-ACK, with all ACK feedback of the high priority HARQ-ACK (e.g., "11" for high priority HARQ-ACK), the 1 bit or 2 bits of low priority HARQ-ACK may be reported on the high priority PUCCH resource. With at least a NACK feedback of the high priority HARQ-ACK (e.g., "01", "10" or "00" for high priority HARQ-ACK), the 1 bit or 2 bits of low priority HARQ-ACK may be reported on the low priority PUCCH resource.

With Method 4, almost no HARQ-ACK information may be lost due to HARQ-ACK bundling. The high priority HARQ-ACK may be represented by the PUCCH resource selection. An ACK may be reported for the high priority HARQ-ACK if the low priority HARQ-ACK is reported on the high priority PUCCH resource. A NACK may be reported for the high priority HARQ-ACK if the low priority HARQ-ACK is reported on the low priority PUCCH resource.

In another aspect, joint coding and multiplexing of HARQ-ACK of different priorities on PUCCH format 2/3/4 are described. A joint coding method is described wherein the high priority HARQ-ACK and low priority HARQ-ACK may be concatenated into a single joint HARQ-ACK coding book for PUCCH transmission. This may be a more general case for HARQ-ACK multiplexing on PUCCH with joint coding.

Some examples of conditions for HARQ-ACK multiplexing using PUCCH format 2/3/4 are now described. PUCCH format 2, PUCCH format 3 and PUCCH format 4 may be defined for more than 2 bits of UCI payload. $O_{ACK\_1}$ may be a total number of HARQ-ACK information bits with priority index 1. $O_{ACK\_0}$ may be a total number of HARQ-ACK information bits with priority index 0.

If there are up to 2 bits of for both high priority HARQ-ACK and low priority HARQ in a HARQ-ACK only reporting, and if method 1 or method 4 above are used, PUCCH format 0 or PUCCH format 1 may always be used for the joint HARQ-ACK multiplexing and reporting. Thus, even if the total payload of high priority HARQ-ACK and low priority HARQ-ACK may be more than 2 bits, a joint report method on PUCCH format 2 or PUCCH format 3 or PUCCH format 4 may not be applicable.

Therefore, in one approach, if method 1 and method 4 above are used for up to 2 bits of HARQ-ACK codebooks, multiplexing of HARQ-ACK of different priorities with joint coding on PUCCH format 2 or PUCCH format 3 or PUCCH format 4 may be only applicable if the number of bits of any HARQ-ACK codebook may be greater than 2 (e.g., under the condition of $O_{ACK\_1}>2$ and $O_{ACK\_0}>2$).

On the other hand, in method 3 above and some cases in method 2, multiplexing of HARQ-ACK of different priorities with joint coding on PUCCH format 2, PUCCH format 3, or PUCCH format 4 may be applied if the total HARQ-ACK payload is more than 2 bits. Furthermore, if the number of bits of any HARQ-ACK codebook may be greater than 2, the low priority HARQ-ACK can be appended to the high priority HARQ-ACK. The joint HARQ-ACK may be always greater than 2 bits and may be reported on a high priority PUCCH resource with PUCCH format 2 or PUCCH format 3 or PUCCH format 4.

Thus, in another approach, if method 2 is used for up to 2 bits of HARQ-ACK codebooks, multiplexing of HARQ-ACK of different priorities with joint coding on PUCCH format 2, PUCCH format 3, or PUCCH format 4 may be applied if the total HARQ-ACK payload of different priorities is more than 2 bits (e.g., under the condition of $$O_{ACK\_1} + O_{ACK\_0} > 2).$$

Yet in another approach, if method 3 is used for up to 2 bits of HARQ-ACK codebooks, 2 bits may be always assumed for up to 2 bits of HARQ-ACK, and the total HARQ-ACK payload may be always more than 2 bits. In case of 1 bit of HARQ-ACK in a codebook, the HARQ-ACK information bit may be repeated to generate two bits (e.g., a bit of "0" may be reported with "00", and a bit of "1" may be reported with "11"). Thus, HARQ-ACK multiplexing on PUCCH format 2, PUCCH format 3, or PUCCH format 4 may always be used, and may be defined as a unified solution that may be applicable to all HARQ-ACK payload sizes. In this case, HARQ-ACK multiplexing with different priorities may not be supported if a UE is configured with only one set of PUCCH resources for the high priority HARQ-ACK.

With HARQ-ACK multiplexing of different priorities and joint coding using PUCCH format 2, PUCCH format 3, or PUCCH format 4, a PUCCH resource configured for the high priority HARQ-ACK may be selected to report the joint HARQ-ACK information.

In some methods, if the total payload exceeds the maximum payload size of all configured sets of high priority HARQ-ACK PUCCH resources, the HARQ-ACK codebook with priority 0 may be dropped, and only the HARQ-ACK codebook with priority index 1 may be reported on a high priority HARQ-ACK PUCCH resource based on the payload of the high priority HARQ-ACK.

In some methods, if the total payload exceeds the maximum payload size of all configured sets of high priority HARQ-ACK PUCCH resources, some payload reduction methods can be applied to the HARQ-ACK codebook with priority 0. The payload reduction method may include some HARQ-ACK bundling schemes. Then, the payload reduced HARQ-ACK with priority 0 can be appended to the HARQ-ACK codebook with priority 1 to create a new joint HARQ-ACK codebook.

The UE may perform PUCCH set selection again based on the payload of the new joint HARQ-ACK information. If there is available high priority HARQ-ACK PUCCH resources to carry the new joint HARQ-ACK information, a high priority HARQ-ACK PUCCH resource may be determined based on the payload of the new joint HARQ-ACK codebook.

If the payload of the new joint HARQ-ACK codebook still exceeds the maximum payload size of all configured sets of high priority HARQ-ACK PUCCH resources, the HARQ-ACK codebook with priority 0 may be dropped, and only the HARQ-ACK codebook with priority index 1 may be reported on a high priority HARQ-ACK PUCCH resource based on the payload of the high priority HARQ-ACK.

PUCCH resource selection is also described herein. The PUCCH resource may be selected based on the total UCI payload size, and a single maxCodeRate may be applied for the UCI coding and rate matching on PUCCH using PUCCH format 2, PUCCH format 3, or PUCCH format 4.

For a HARQ-ACK codebook with high priority or a HARQ-ACK codebook with low priority, a UE can be configured up to four sets of PUCCH resources. A set of PUCCH resources may be provided by PUCCH-ResourceSet and may be associated with a set of PUCCH resources index provided by pucch-ResourceSetId, with a set of PUCCH resource indexes provided by resourceList that provides a set of PUCCH-Resourceld used in the Set of PUCCH resources, and with a maximum number of UCI information bits the UE can transmit using a PUCCH resource in the set of PUCCH resources provided by maxPayloadSize. For the first set of PUCCH resources, the maximum number of UCI information bits may be 2. A maximum number of PUCCH resource indexes for a set of PUCCH resources may be provided by maxNrofPUCCH-ResourcesPerSet. The maximum number of PUCCH resources in the first set of PUCCH resources may be 32 and the maximum number of PUCCH resources in the other set of PUCCH resources may be 8.

If the UE transmits $O_{UCI}$ UCI information bits, that include HARQ-ACK information bits, the UE may determine a set of PUCCH resources to be a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously.

Alternatively, the UE may determine a set of PUCCH resources to be a second set of PUCCH resources with pucch-ResourceSetId=1, if provided by higher layers, if $2<O_{UCI} \leq N_2$ where $N_2$ is equal to maxPayloadSize if maxPayloadSize is provided for the set of PUCCH resources with pucch-ResourceSetId=1, otherwise $N_2$ is equal to 1706.

In another alternative, the UE may determine a set of PUCCH resources to be a third set of PUCCH resources with pucch-ResourceSetId=2, if provided by higher layers, if $N_2 \leq O_{UCI} \leq N_3$ where $N_3$ is equal to maxPayloadSize if maxPayloadSize is provided for the Set of PUCCH resources with pucch-ResourceSetId=2; otherwise $N_3$ is equal to 1706, or In another alternative, the UE may determine a set of PUCCH resources to be a fourth set of PUCCH resources with pucch-ResourceSetId=3, if provided by higher layers, if $$N_3 < O_{UCI} \leq 1706.$$

The sets of PUCCH resources for the high priority HARQ-ACK and low priority HARQ-ACK may be configured separately with different PUCCH parameters and PUCCH configurations. In NR release-15 and 16, the HARQ-ACK of a given priority may be reported only on a HARQ-ACK PUCCH resource with the same priority. UCI multiplexing of the same priority can be performed and transmitted on a PUCCH with the same priority (e.g., HARQ-ACK and/or SR and/or CSI with the same priority can be multiplexed and reported on a PUCCH resource with the same priority). HARQ-ACK and SR can be configured with priority index 1 (high priority) or priority index 0 (low priority), but CSI may be always treated as low priority in Rel-16.

To maintain the reliability requirements of high priority HARQ-ACK, in the case that HARQ-ACK multiplexing of different priorities may be supported on PUCCH, a PUCCH resource configured for the high priority HARQ-ACK may be selected to report the multiplexed HARQ-ACK information.

For multiplexing of HARQ-ACK with different priorities with joint coding, and in that case that the total payload is more than 2 bits, for a HARQ-ACK only reporting on a PUCCH using PUCCH format 2, PUCCH format 3, or PUCCH format 4, the payload size may be determined by $O_{ACK}=O_{ACK\_1}+O_{ACK\_0}$, as the number of bits for HARQ-ACK for transmission on the current PUCCH, where $O_{ACK}>2$, $O_{ACK\_1}$ is a total number of HARQ-ACK information bits with priority index 1, $O_{ACK\_0}$ is a total number of HARQ-ACK information bits with priority index 0.

The HARQ-ACK multiplexing may happen when the PUCCH for low priority HARQ-ACK and the PUCCH for high priority HARQ-ACK overlaps with each other in a slot. For HARQ-ACK only reporting with joint coding, the joint HARQ-ACK codebook may be constructed by appending the HARQ-ACK information bits with priority index 0 to the end of the HARQ-ACK information bits with priority index 1.

The UE may determine a set of PUCCH resources based on the $O_{UCI}$ UCI information bits as described above. For HARQ-ACK with different priorities and joint coding, $O_{UCI}$ may be given by $$O_{ACK} = O_{ACK\_1} + O_{ACK\_0}.$$

For a PUCCH transmission with HARQ-ACK information, a UE may determine a PUCCH resource after determining a set of PUCCH resources for $O_{UCI}$ HARQ-ACK information bits. The PUCCH resource determination may be based on a PUCCH resource indicator field, if present, in a last DCI format, among the DCI fonnats that have a value of a PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided CORESETPoolIndex or is provided CORESETPoolIndex with value 0 for one or more first CORESETs and is provided CORESETPoolIndex with value 1 for one or more second CORESETs on an active DL BWP of a serving cell, and with ACKNACKFeedbackMode=JointFeedback for the active UL BWP, detected DCI formats from PDCCH receptions in the first CORESETs may be indexed prior to detected DCI formats from PDCCH receptions in the second CORESETs.

The PUCCH resource indicator field values may map to values of a set of PUCCH resource indexes, as defined in Table-5 for a PUCCH resource indicator field of 3 bits, provided by resourceList for PUCCH resources from a set of PUCCH resources provided by PUCCH-ResourceSet with a maximum of eight PUCCH resources. If the PUCCH resource indicator field includes 1 bit or 2 bits, the values map to the first 2 values or the first four values, respectively, of Table-5.

For the first set of PUCCH resources and when the size $R_{PUCCH}$ of resourceList is larger than eight, when a UE provides HARQ-ACK information in a PUCCH transmission in response to detecting a last DCI format in a PDCCH reception, among DCI formats with a value of the PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, the UE may determine a PUCCH resource with index $r_{PUCCH}$, $0 \le r_{PUCCH} \le R_{PUCCH}-1$, as $$r_{PUCCH} = \begin{cases} \left\lfloor \frac{n_{CCE,p} \cdot \lceil R_{PUCCH}/8 \rceil}{n_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{n_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \ge R_{PUCCH} \bmod 8 \end{cases}$$

where $N_{CCE,p}$ is a number of CCEs in CORESET p of the PDCCH reception for the DCI format, $n_{CCE,p}$ is the index of a first CCE for the PDCCH reception, and $\Delta_{PRI}$ is a value of the PUCCH resource indicator field in the DCI format.

Table-5 illustrates examples for mapping of PUCCH resource indication field values to a PUCCH resource in a PUCCH resource set with maximum 8 PUCCH resources.

TABLE 5

| PUCCH resource indicator | | | |
|---|---|---|---|
| 1 bit | 2 bits | 3 bits | PUCCH resource |
| ‘0’ | ‘00’ | ‘000’ | $1^{st}$ PUCCH resource provided by pucch-ResourceId obtained from the $1^{st}$ value of resourceList |
| ‘1’ | ‘01’ | ‘001’ | $2^{nd}$ PUCCH resource provided by pucch-ResourceId obtained from the $2^{nd}$ value of resourceList |
| | ‘10’ | ‘010’ | $3^{rd}$ PUCCH resource provided by pucch-ResourceId obtained from the $3^{rd}$ value of resourceList |
| | ‘11’ | ‘011’ | $4^{th}$ PUCCH resource provided by pucch-ResourceId obtained from the $4^{th}$ value of resourceList |
| | | ‘100’ | $5^{th}$ PUCCH resource provided by pucch-ResourceId obtained from the $5^{th}$ value of resourceList |
| | | ‘101’ | $6^{th}$ PUCCH resource provided by pucch-ResourceId obtained from the $6^{th}$ value of resourceList |
| | | ‘110’ | $7^{th}$ PUCCH resource provided by pucch-ResourceId obtained from the $7^{th}$ value of resourceList |
| | | ‘111’ | $8^{th}$ PUCCH resource provided by pucch-ResourceId obtained from the $8^{th}$ value of resourceList |

If a UE detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE may not expect to multiplex HARQ-ACK information corresponding to the second DCI format in a PUCCH resource in the slot if the PDCCH reception that includes the second DCI format is not earlier than $N_3\cdot(2048+144)\cdot\kappa\cdot 2^{-\mu}\cdot T_c$ from the beginning of a first symbol of the first resource for PUCCH transmission in the slot where, r and $T_c$ are defined in clause 4.1 of 3GPP TS 38.211 and p corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $$\mu = 0,\ N_3 = 4.5 \text{ for } \mu = 1,\ N_3 = 9 \text{ for } \mu = 2; \text{ otherwise,}$$
$$N_3 = 8 \text{ for } \mu = 0,\ N_3 = 10 \text{ for } \mu = 1,\ N_3 = 17 \text{ for } \mu = 2, \text{ and}$$
$$N_3 = 20 \text{ for } \mu = 3.$$

If a UE may not be provided SPS-PUCCH-AN-List and transmits HARQ-ACK information corresponding only to a PDSCH reception without a corresponding PDCCH, a PUCCH resource for corresponding PUCCH transmission with HARQ-ACK information may be provided by n1PUCCH-AN.

It should be noted that the PUCCH resource determination may be performed independently for HARQ-ACK with a given priority index. For a PUCCH transmission with joint HARQ-ACK information with different priorities, a UE determines a high priority PUCCH resource after determining a set of high priority PUCCH resources for $O_{UCI}$ joint HARQ-ACK information bits. The PUCCH resource determination may be based on the above procedures for the high priority PDSCH transmissions. For example, the PUCCH resource determination may be based on a PUCCH resource indicator field in a last DCI format scheduling a high priority PDSCH transmission, among the DCI formats that have a value of a PDSCH-to-HARQ feedback timing indicator field, indicating a same slot for the PUCCH transmission.

Code rate and PRB determination for HARQ-ACK multiplexing on PUCCH is now described. A UE may be configured by maxCodeRate a code rate for multiplexing HARQ-ACK, SR, and CSI report(s) in a PUCCH transmission using PUCCH format 2, PUCCH format 3, or PUCCH format 4. In some examples, maxCodeRate may be applicable only for different UCI types with the same priorities can be multiplexed on PUCCH using PUCCH format 2, PUCCH format 3, or PUCCH format 4.

Thus, in the PUCCH-Config for priority index 1, a UE may be configured by maxCodeRate a code rate for multiplexing HARQ-ACK, and SR in a PUCCH transmission using PUCCH format 2, PUCCH format 3, or PUCCH format 4. And, in the PUCCH-Config for priority index 0, a UE may be configured by a separate maxCodeRate a code rate for multiplexing HARQ-ACK, SR, and CSI report(s) in a PUCCH transmission using PUCCH format 2, PUCCH format 3, or PUCCH format 4.

As an enhancement for UCI reporting, the same UCI type with different priorities can be supported, especially for HARQ-ACK. For multiplexing of HARQ-ACK with different priorities and joint coding on PUCCH format 2, PUCCH format 3, or PUCCH format 4, the maxCodeRate configured for the high priority PUCCH in the corresponding PUCCH-Config may be applied.

In the case of HARQ-ACK multiplexing with different priorities with joint coding, the maxCodeRate configured for the high priority PUCCH-Config may also be applied to the joint high priority HARQ-ACK and low priority HARQ-ACK bits in a PUCCH transmission using PUCCH format 2, PUCCH format 3, or PUCCH format 4.

In the following, r is a code rate given by maxCodeRate as in Table-5 configured for the selected PUCCH resource.

$$M_{RB}^{PUCCH}$$

is a number of PRBs for PUCCH format 2, or PUCCH format 3, or PUCCH format 4, respectively, where $$M_{RB}^{PUCCH}$$

is provided by nrofPRBs in PUCCH-format2 for PUCCH format 2 or by nrofPRBs in PUCCH-format3 for PUCCH format 3, and $$M_{RB}^{PUCCH} = 1$$

for PUCCH format 4.

$$N_{sc,ctrl}^{RB} = N_{sc}^{RB} - 4$$

for PUCCH format 2 or, if the PUCCH resource with PUCCH format 2 includes an orthogonal cover code with length $$N_{SF}^{PUCCH,2}$$

provided by OCC-Length-r16, $$N_{sc,ctrl}^{RB} = \left(N_{sc}^{RB} - 4\right)/N_{SF}^{PUCCH,2},\ N_{sc,ctrl}^{RB} = N_{sc}^{RB}$$

for PUCCH format 3 or, if the PUCCH resource with PUCCH format 3 includes an orthogonal cover code with length $$N_{SF}^{PUCCH,3}$$

provided by OCC-Length-r16, $$N_{sc,ctrl}^{RB} = N_{sc}^{RB}/N_{SF}^{PUCCH,3}, \text{ and } N_{sc,ctrl}^{RB} = N_{sc}^{RB}/N_{SF}^{PUCCH,4}$$

for PUCCH format 4, where $$N_{sc}^{RB}$$

is a number of subcarriers per resource block.

$$N_{symb-UCI}^{PUCCH}$$

is equal to a number of PUCCH symbols $$N_{symb}^{PUCCH,2}$$

for PUCCH format 2 provided by nrofSymbols in PUCCH-format2. For PUCCH format 3 or for PUCCH format 4, $$N_{symb-UCI}^{PUCCH}$$

is equal to a number of PUCCH symbols $$N_{symb}^{PUCCH,3}$$

for PUCCH format 3 or equal to a number of PUCCH symbols $$N_{symb}^{PUCCH,4}$$

for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively.

$Q_m$=1if pi/2-BPSK is the modulation scheme and $Q_m$=2 if QPSK is the modulation scheme as indicated by pi2BPSK for PUCCH format 3 or PUCCH format 4. For PUCCH format 2, $Q_m$=2.

For a HARQ-ACK only PUCCH reporting on PUCCH format 2/3/4, the payload size is determined by $O^{ACK}$, as the number of bits for HARQ-ACK for transmission on the current PUCCH, where $O^{ACK}>2$. In the case of HARQ-ACK multiplexing with different priorities on PUCCH with joint coding, the payload size may be determined by $O_{ACK}=O_{ACK\_1}+O_{ACK\_0}$ as given above.

In some examples, $O_{ACK}$ is a total number of HARQ-ACK information bits, where $O_{ACK}=O_{ACK\_1}+O_{ACK\_0}$. $O_{CRC}$ is a number of CRC bits, if any, for encoding the number of $O_{ACK}$ HARQ-ACK bits. If $O_{ACK}$<=11 bits, $O_{UCI}=O_{ACK}$. If $O_{ACK}$>11 bits, $O_{UCI}=O_{ACK}+O_{CRC}$, where $O_{CRC}$ is the number of CRC bits based on $O_{ACK}$.

If a UE transmits a PUCCH with $O_{ACK}$ HARQ-ACK information bits and $O_{CRC}$ bits using PUCCH format 2 or PUCCH format 3 in a PUCCH resource that includes $$M_{RB}^{PUCCH}$$

PRBs, the UE may determine a number of PRBs $$M_{RB,min}^{PUCCH}$$

for the PUCCH transmission to be the minimum number of PRBs, that is less than or equal to a number of PRBs $$M_{RB}^{PUCCH}$$

provided respectively by nrofPRBs of PUCCH-format2 or nrofPRBs of PUCCH-format3 and start from the first PRB from the number of PRBs, that results to $$(O_{ACK}+O_{CRC}) \le M_{RB,min}^{PUCCH} \cdot N_{sc,ctrl}^{RB} \cdot N_{symb-UCI}^{PUCCH} \cdot Q_m \cdot r \text{ and,}$$

$$\text{if } M_{RB}^{PUCCH} > 1,\ (O_{ACK}+O_{CRC}) \le \left(M_{RB,min}^{PUCCH}-1\right) \cdot N_{sc,ctrl}^{RB} \cdot N_{symb-UCI}^{PUCCH} \cdot Q_m \cdot r,$$

$$\text{where } N_{sc,ctrl}^{RB},\ N_{symb-UCI}^{PUCCH},\ Q_m, \text{ and } r$$

are defined above. For PUCCH format 3, if $$M_{RB,min}^{PUCCH}$$

is not equal to $2^{\alpha_2} \cdot 3^{\alpha_3} \cdot 5^{\alpha_5}$ according to TS 38.211, $$M_{RB,min}^{PUCCH}$$

is increased to the nearest allowed value of nrofPRBs for PUCCH-format3. If $$(O_{ACK}+O_{CRC}) > \left(M_{RB}^{PUCCH}-1\right) \cdot N_{sc,ctrl}^{RB} \cdot N_{symb-UCI}^{PUCCH} \cdot Q_m \cdot r,$$

the UE may transmit the PUCCH over $$M_{RB}^{PUCCH}$$

PRBs.

If a UE is provided a first interlace of $$M_{Interlace,0}^{PUCCH}$$

PRBs by interlace0 in InterlaceAllocation-r16 and transmits a PUCCH with $O_{ACK}$ HARQ-ACK information bits and $O_{CRC}$ bits using PUCCH format 2 or PUCCH format 3, the UE may transmit the PUCCH over the first interlace if $$(O_{ACK}+O_{CRC}) \le M_{Interlace,0}^{PUCCH} \cdot N_{sc,ctrl}^{RB} \cdot N_{symb-UCI}^{PUCCH} \cdot Q_m \cdot r;$$

otherwise, if the UE is provided a second interlace by interlace1 in PUCCH-format2 or PUCCH-format3, the UE may transmit the PUCCH over the first and second interlaces.

It should be noted that for a single HARQ-ACK priority reporting, if the number of PRBs calculated based on the maxCodeRate is more than the configured number of PRBs, the configured maximum number of PRBs may be used for the PUCCH transmission. For example, if $$(O_{ACK}+O_{CRC})>\left(M_{RB}^{PUCCH}-1\right)\cdot N_{sc,ctrl}^{RB}\cdot N_{symb-UCI}^{PUCCH}\cdot Q_m\cdot r,$$

the UE transmits the PUCCH over $$M_{RB}^{PUCCH}$$

PRBs.

For HARQ-ACK multiplexing with different priorities, the same method can be applied. Thus, after a PUCCH resource is determined based on the total payload of the HARQ-ACK codebooks with different priorities, the UE may determine the number of PRBs to multiplex the coded output of the joint HARQ-ACK codebook. If the UE determines the number of PRBs to multiplex the joint HARQ-ACK codebook based on the maxCodeRate is more than the configured maximum number of PRBs.

In one approach, the configured maximum number of PRBs may be used for the PUCCH transmission. For example, if $$(O_{ACK}+O_{CRC})>\left(M_{RB}^{PUCCH}-1\right)N_{sc,ctrl}^{RB}\cdot N_{symb-UCI}^{PUCCH}\cdot Q_m\cdot r,$$

the UE transmits the PUCCH over $$M_{RB}^{PUCCH}$$

PRBs. In this case, the actual maximum code rate for the UCI may be higher than the configured maxCodeRate.

In another approach, the UE may choose to drop the low priority HARQ-ACK to guarantee the performance of high priority HARQ-ACK. Thus, the HARQ-ACK codebook with priority index 0 may not be reported. The HARQ-ACK codebook with priority index 1 may be reported on a high priority HARQ-ACK PUCCH resource reselected based on the payload of the high priority HARQ-ACK.

In yet another approach, the UE may perform some bundling methods to reduce the payload size of the low priority HARQ-ACK. The payload reduced HARQ-ACK with priority 0 can be appended to the HARQ-ACK codebook with priority 1 to create a new joint HARQ-ACK codebook. Then the UE may perform PUCCH set selection and UCI multiplexing again based on the payload of the new joint HARQ-ACK information and the maxCodeRate of the PUCCH resource.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to perform joint coding and/or multiplexing of deferred SPS HARQ-ACK as described herein. For instance, the gNB 160, the gNB operations module 182, and/or the gNB scheduling module 194 may perform one or more of the methods (e.g., method 1300 described in relation to FIG. 13, etc.), operations, functions, approaches, and/or examples described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
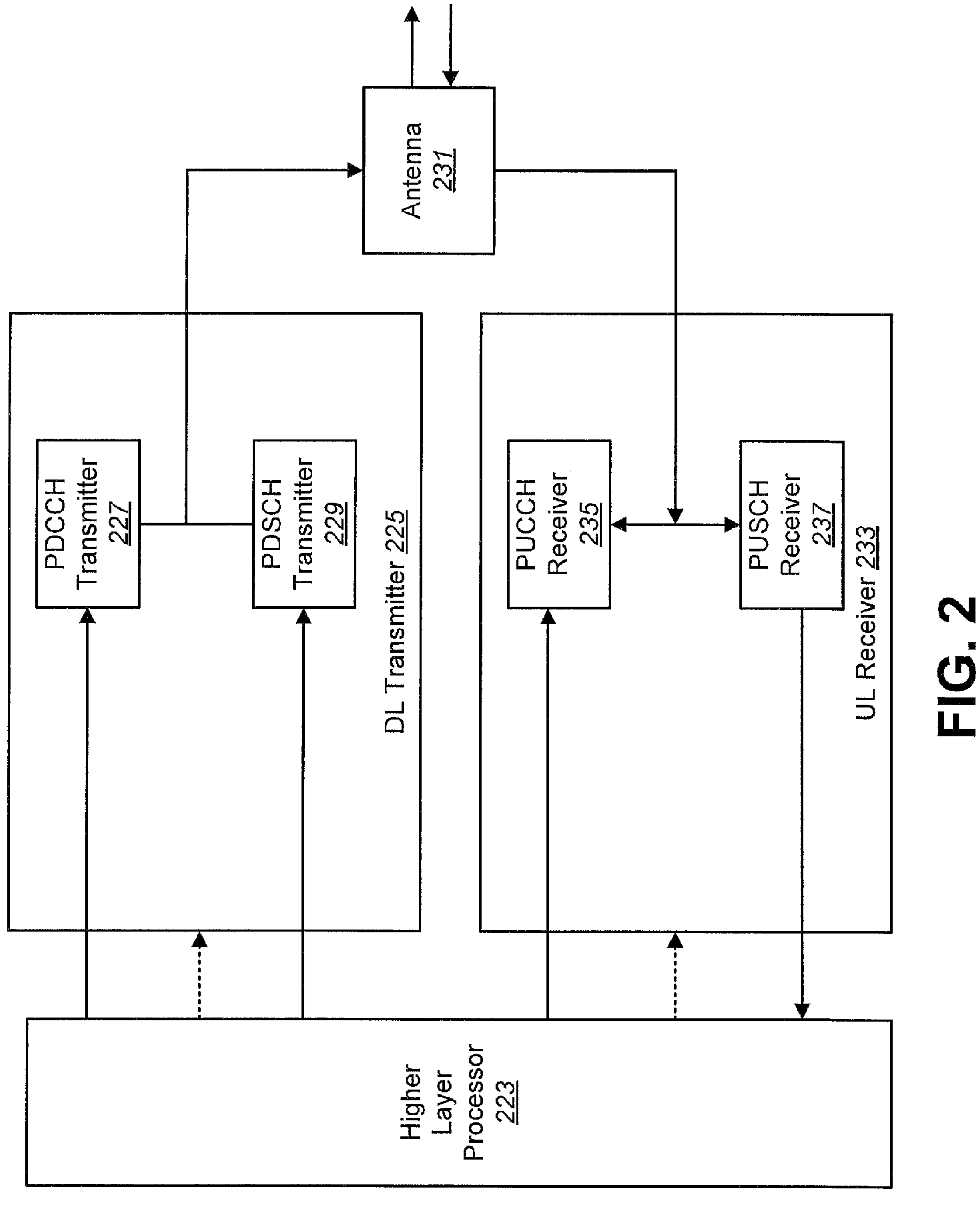
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
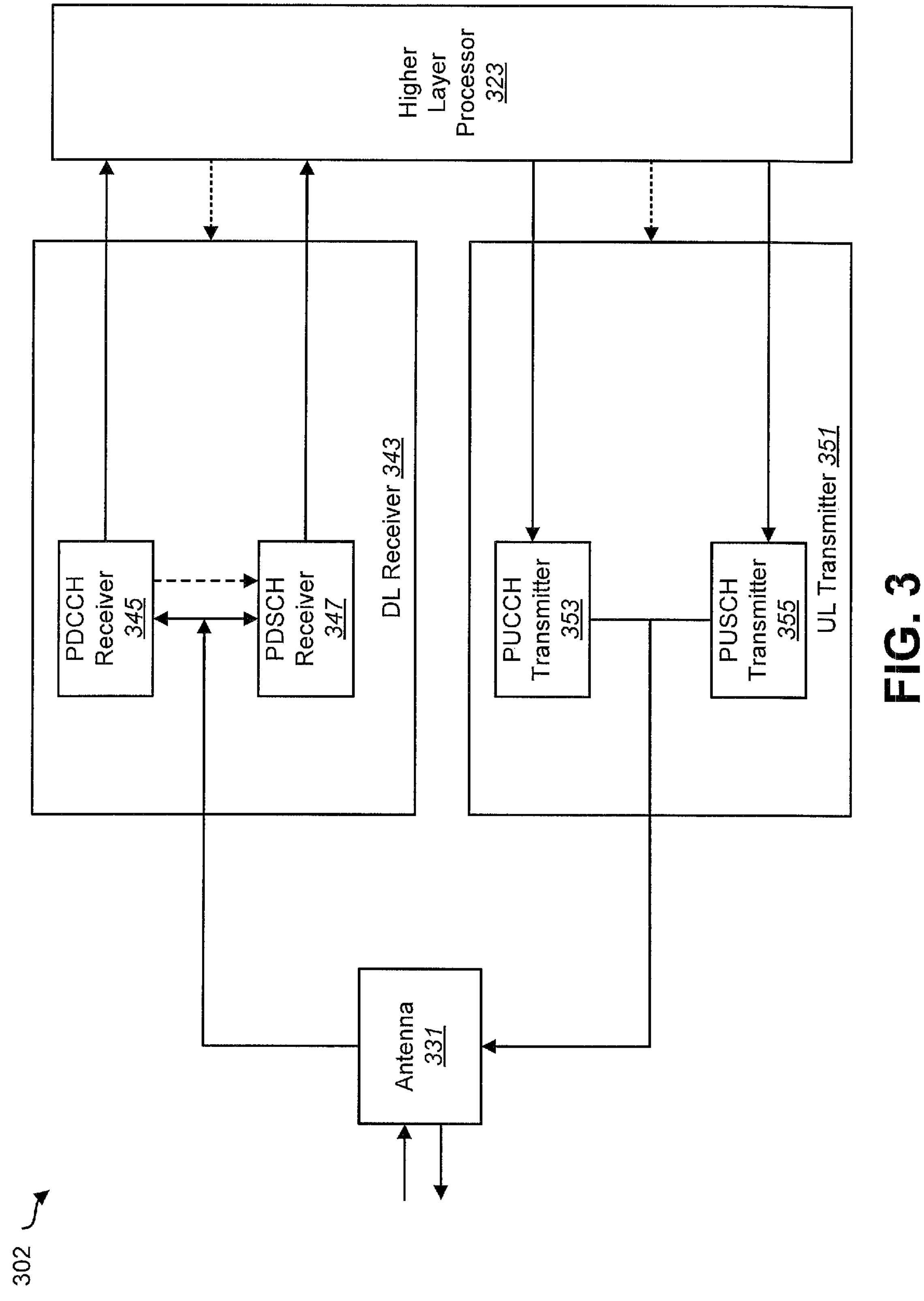
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323

DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
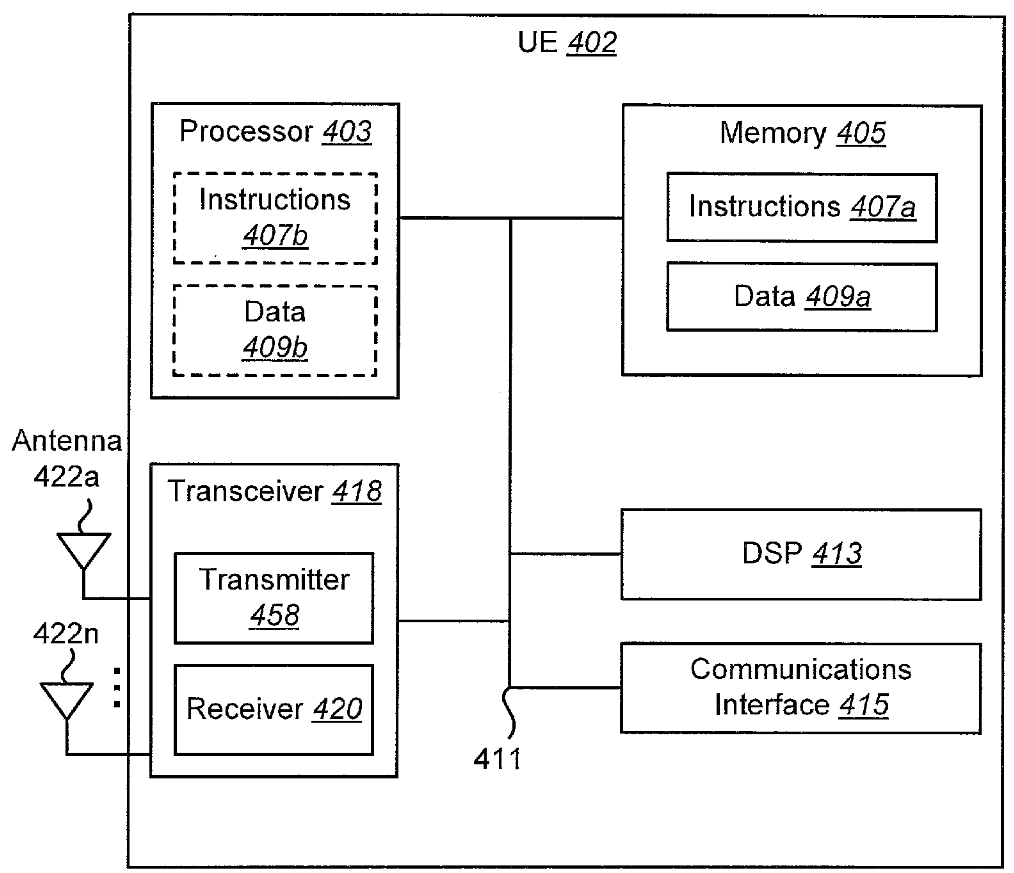
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422*a-n* are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
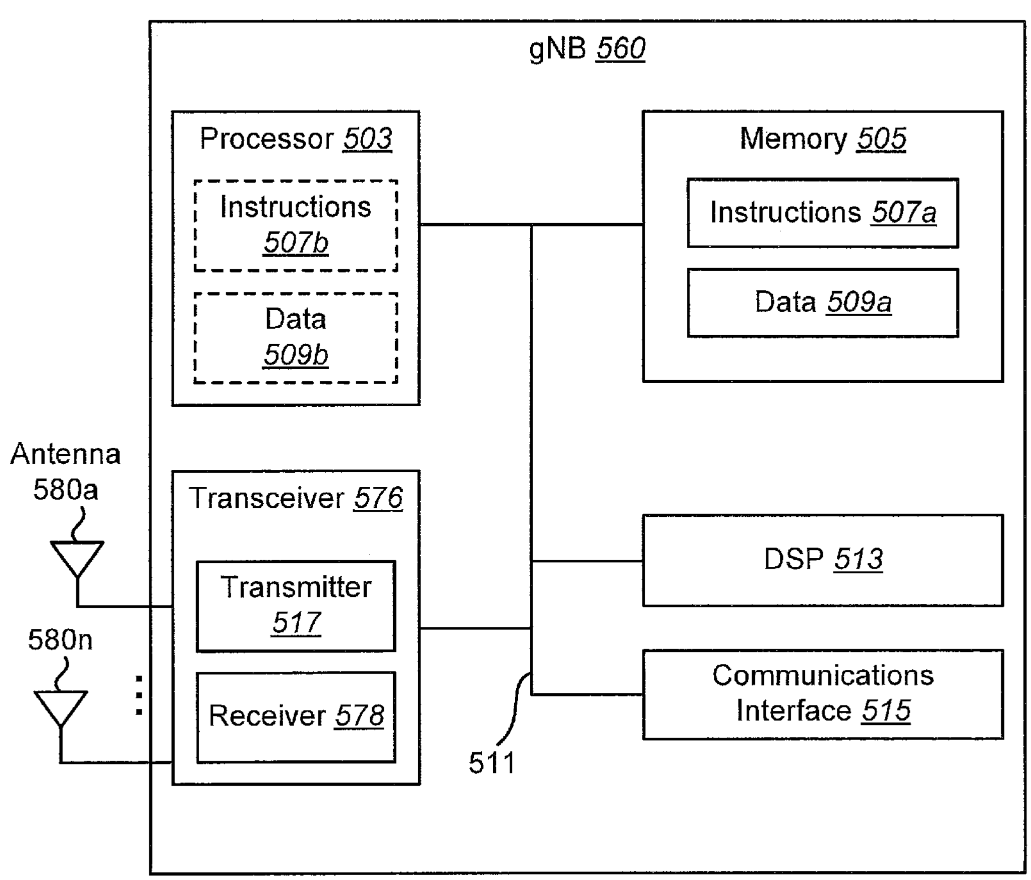
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
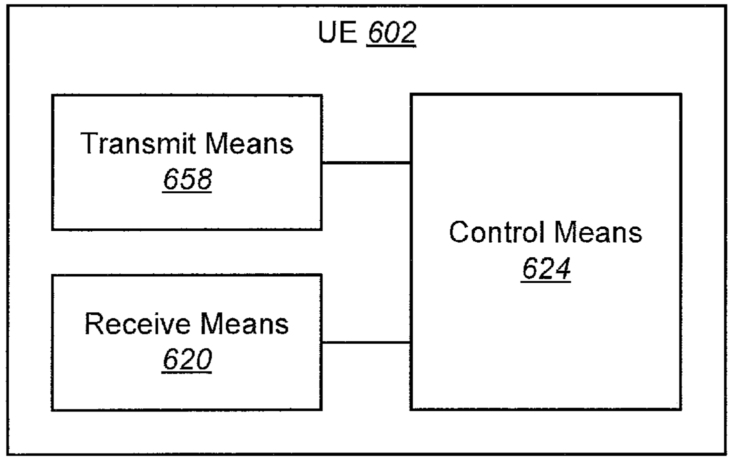
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
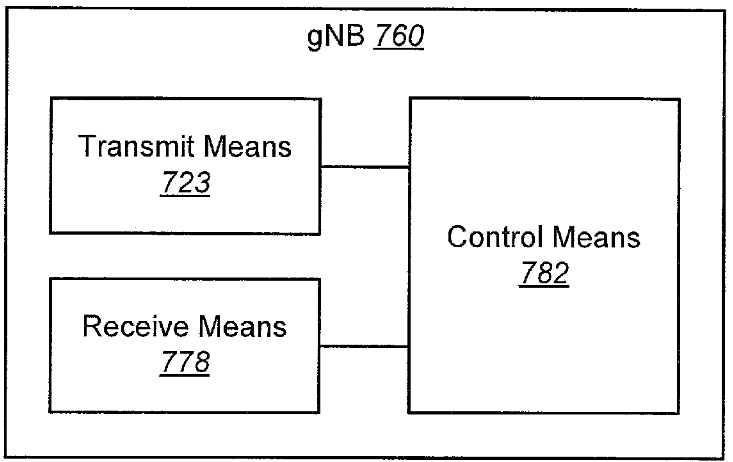
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

Figure 8:
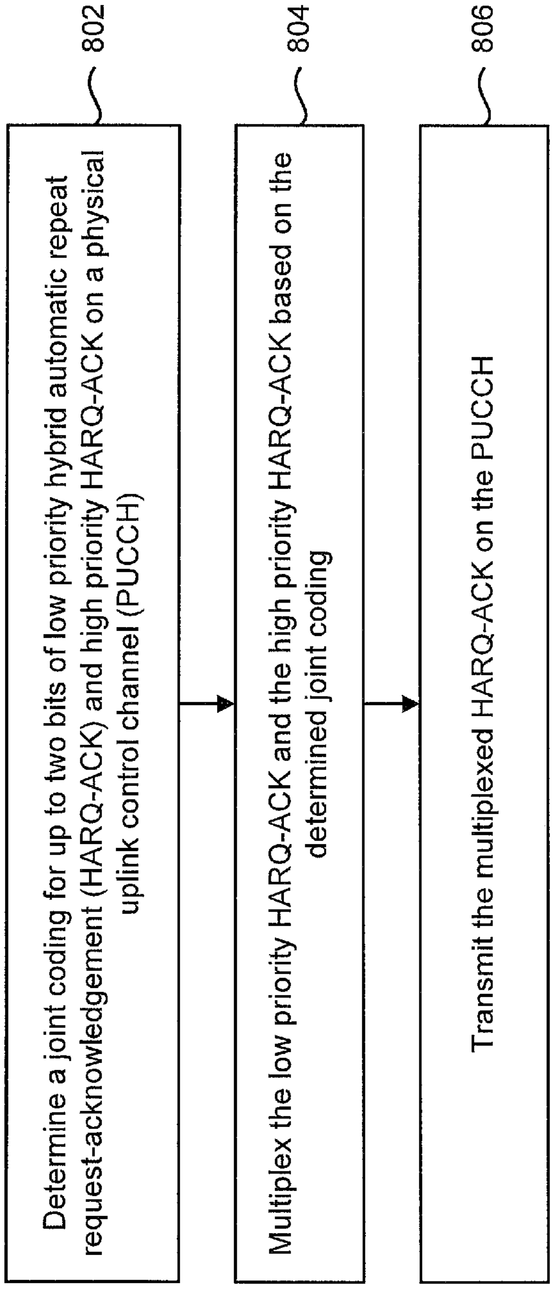
FIG. 8 is a flow diagram illustrating a method by a UE for code rate determination for multiplexing of HARQ-ACK with different priorities on PUCCH for up to 2 bits HARQ-ACK codebooks.

FIG. 8 is a flow diagram illustrating a method 800 by a UE 102 for multiplexing of HARQ-ACK with different priorities on PUCCH for up to 2 bits HARQ-ACK codebooks. The UE 102 may determine 802 a joint coding for up to two bits of low priority hybrid automatic repeat request-acknowledgement (HARQ-ACK) and high priority HARQ-ACK on a physical uplink control channel (PUCCH). The UE 102 may multiplex 804 the low priority HARQ-ACK and the high priority HARQ-ACK based on the determined joint coding. The UE 102 may transmit 806 the multiplexed HARQ-ACK on the PUCCH.

In Method 1, the UE 102 may use the same PUCCH resource with format 0 or format 1 for the high priority HARQ-ACK. PUCCH format 0/1 are sequence based formats that support up to 2 bits of UCI.

In a first approach (Approach 1), HARQ-ACK multiplexing may be performed with bundling within the same priority to a total of 2 bits. The multiplexed HARQ-ACK may be reported on the high priority HARQ-ACK PUCCH resource with PUCCH format 0 or PUCCH format 1 with combinations as follows.

The multiplexed HARQ-ACK may include 1 bit of high priority HARQ-ACK and 1 bit of low priority HARQ-ACK. High priority HARQ-ACK and low priority HARQ-ACK may be concatenated to 2 bits.

The multiplexed HARQ-ACK may include 1 bit of high priority HARQ-ACK and 2 bits of low priority HARQ- ACK. The 2 bits of low priority HARQ-ACK may be bundled into 1 bit. The bundled low priority bit may be appended after the high priority HARQ-ACK.

The multiplexed HARQ-ACK may include 2 bits of high priority HARQ-ACK and 1 bit of low priority HARQ-ACK. The 2 bits of high priority HARQ-ACK may be bundled into 1 bit, then concatenated by appending the low priority HARQ-ACK to the bundled high priority HARQ-ACK bit.

The multiplexed HARQ-ACK may include 2 bit of high priority HARQ-ACK and 2 bit of low priority HARQ-ACK. The 2 bits of high priority HARQ-ACK may be bundled into 1 bit. The 2 bits of low priority HARQ-ACK may also be bundled into 1 bit. The bundled high priority HARQ-ACK and bundled low priority HARQ-ACK may be concatenated to 2 bits.

In a second approach (Approach 2), HARQ-ACK multiplexing may include bundling between different priorities to a total of 2 bits, and reporting on the high priority HARQ-ACK PUCCH resource with PUCCH format 0 or PUCCH format 1 with combinations as follows.

The multiplexed HARQ-ACK may include 1 bit of high priority HARQ-ACK and 1 bit of low priority HARQ-ACK. High priority HARQ-ACK and low priority HARQ-ACK may be concatenated to 2 bits.

The multiplexed HARQ-ACK may include 1 bit of high priority HARQ-ACK and 2 bits of low priority HARQ-ACK. The 1 bit high priority HARQ-ACK may be bundled into the first bit of low priority HARQ-ACK, or the 1 bit high priority HARQ-ACK may be bundled into the second bit of low priority HARQ-ACK.

The multiplexed HARQ-ACK may include 2 bits of high priority HARQ-ACK and 1 bit of low priority HARQ-ACK. The 1 bit low priority HARQ-ACK may be bundled into the first bit of high priority HARQ-ACK, or the 1 bit low priority HARQ-ACK may be bundled into the second bit of high priority HARQ-ACK.

The multiplexed HARQ-ACK may include 2 bits of high priority HARQ-ACK and 2 bits of low priority HARQ-ACK. The first bit high priority HARQ-ACK and the first bit low priority HARQ-ACK may be bundled into 1 bit. The second bit of high priority HARQ-ACK and the second bit low priority HARQ-ACK may be bundled into 1 bit, then the bundled bits may be concatenated.

In a third approach (Approach 3), HARQ-ACK bundling may be allowed between different priorities with high priority NACK overwriting. For multiplexing of 1 bit or 2 bits of high priority HARQ-ACK and 1 bit of low priority HARQ-ACK, Approach 1 may be used as described above.

For multiplexing of 1 bit or 2 bits of high priority HARQ-ACK and 2 bits of low priority HARQ-ACK, if the high priority HARQ-ACK is all ACKs, i.e. "1" for 1 bit and "11" for 2 bits of HARQ-ACK, the 2 bits of low priority HARQ-ACK may be reported on the high priority PUCCH resource. If the high priority HARQ-ACK has at least a NACK, i.e. "0" for 1 bit or "01", "10" or "11" for 2 bits of HARQ-ACK, the UE should report all NACKs, i.e. "00" on the high priority PUCCH resource. The 2 bits of low priority HARQ-ACK may be overwritten by the high priority NACK.

In a fourth approach (Approach 4), for PUCCH format 0, HARQ-ACK bundling may be applied for low priority HARQ-ACK, and cyclic shift values are used to represent low priority HARQ-ACK. The status of the low priority HARQ-ACK may be represented by a cyclic shift on the sequence and cyclic shift determined by the high priority HARQ-ACK information bits. Only 1 bit of low priority HARQ-ACK bit may be reported. In the case of 2 bits of low priority HARQ-ACK, the 2 bits may be bundled into 1 bit.

In a second method (Method 2), the PUCCH resource may be chosen based on total payload. PUCCH format 2/3/4 may be used if the total payload is greater than 2. For a 1 bit high priority HARQ-ACK and 1 bit low priority HARQ-ACK, the high priority HARQ-ACK and low priority HARQ-ACK may be concatenated to 2 bits. The HARQ-ACK may be reported on the original PUCCH for the high priority HARQ-ACK with PUCCH format 0 or PUCCH format 1.

For 1 bit high priority HARQ-ACK and 2 bits low priority HARQ-ACK, two approaches may be implemented. 2 bits of low priority HARQ-ACK may be bundled into 1 bit, then the bundled low priority bit may be appended after the high priority HARQ-ACK. The HARQ-ACK may be reported on the original PUCCH for high priority HARQ-ACK with PUCCH format 0 or PUCCH format 1. In another approach, the high priority HARQ-ACK and low priority HARQ-ACK may be concatenated and reported on a PUCCH resource with PUCCH format 2/3/4 for more than 2 bits.

For 2 bits of high priority HARQ-ACK and 1 bit or 2 bits of low priority HARQ-ACK, the high priority HARQ-ACK and low priority HARQ-ACK may be concatenated and reported on a PUCCH resource with PUCCH format 2/3/4 for more than 2 bits.

In a third method (Method 3), PUCCH format 2/3/4 may be used with more than 2 bits of UCI payload. In this case, 2 bits for a HARQ-ACK codebook with no more than 2 bits may be assumed. In the case of 1 bit of HARQ-ACK, the HARQ-ACK bit may be repeated to generate 2 bits. Then the two bits of high priority HARQ-ACK and 2 bits of low priority HARQ-ACK may be concatenated and reported on a high priority HARQ-ACK PUCCH resource with PUCCH format 2/3/4 for more than 2 bits.

In a fourth method (Method 4), joint HARQ-ACK multiplexing and reporting may be based on PUCCH channel selection. The low priority HARQ-ACK bits may be reported on a HARQ-ACK PUCCH resource. The high priority HARQ-ACK may be represented by the PUCCH resource selection. An ACK may be reported for the high priority HARQ-ACK if the low priority HARQ-ACK is reported on the high priority PUCCH resource. A NACK may be reported for the high priority HARQ-ACK if the low priority HARQ-ACK is reported on the low priority PUCCH resource.

For multiplexing of 1 bit or 2 bits of high priority HARQ-ACK and 1 or 2 bits of low priority HARQ-ACK, if the high priority HARQ-ACK is all ACKs, i.e. "1" for 1 bit and "11" for 2 bits of HARQ-ACK, the 2 bits of low priority HARQ-ACK may be reported on the high priority PUCCH resource. If the high priority HARQ-ACK has at least a NACK, i.e. "0" for 1 bit or "01", "10" or "11" for 2 bits of HARQ-ACK, the UE may report all NACKs, i.e. "00" on the high priority PUCCH resource. The 2 bits of low priority HARQ-ACK may be overwritten by the high priority NACK.

For multiplexing of 1 bit of high priority HARQ-ACK and 1 bit or 2 bits of low priority HARQ-ACK, if the high priority HARQ-ACK is all ACKs, i.e. "1" for 1 bit and "11" for 2 bits of HARQ-ACK, the 1 bit or 2 bits of low priority HARQ-ACK may be reported on the high priority PUCCH resource. If the high priority HARQ-ACK has at least a NACK, i.e. "0" for 1 bit or "01", "10" or "11" for 2 bits of HARQ-ACK, the 1 bit or 2 bits of low priority HARQ-ACK may be reported on the low priority PUCCH resource. In this case, high priority PUCCH may not be transmitted.

Figure 9:
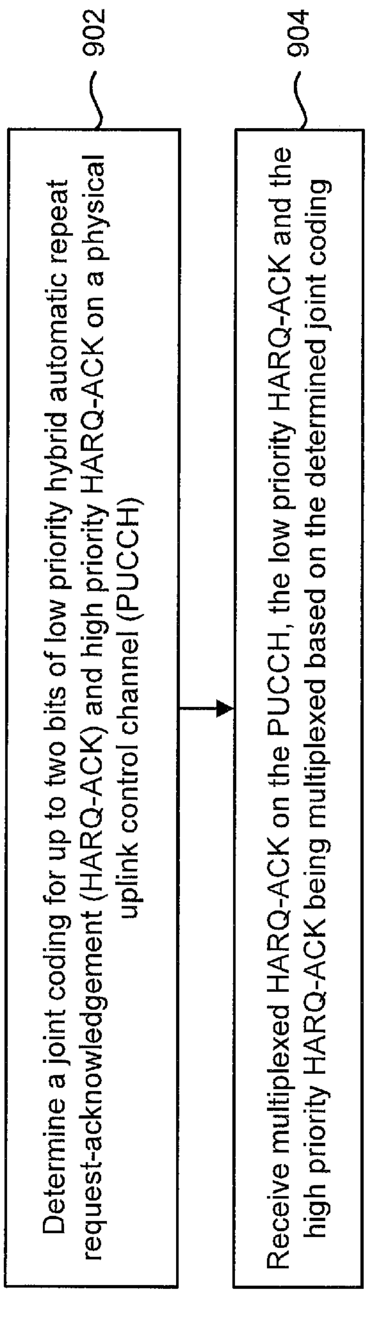
FIG. 9 is a flow diagram illustrating a method by a gNB for code rate determination for multiplexing of HARQ-ACK with different priorities on PUCCH for up to 2 bits HARQ-ACK codebooks.

FIG. 9 is a flow diagram illustrating a method 900 by a gNB 160 for multiplexing of HARQ-ACK with different priorities on PUCCH for up to 2 bits HARQ-ACK codebooks. The gNB 160 may determine 902 a joint coding for up to two bits of a low priority hybrid automatic repeat request-acknowledgement (HARQ-ACK) that is multiplexed with a high priority HARQ-ACK on a physical uplink control channel (PUCCH). The gNB 160 may receive 904 multiplexed HARQ-ACK on the PUCCH. The low priority HARQ-ACK and the high priority HARQ-ACK may be multiplexed based on the determined joint coding.

Figure 10:
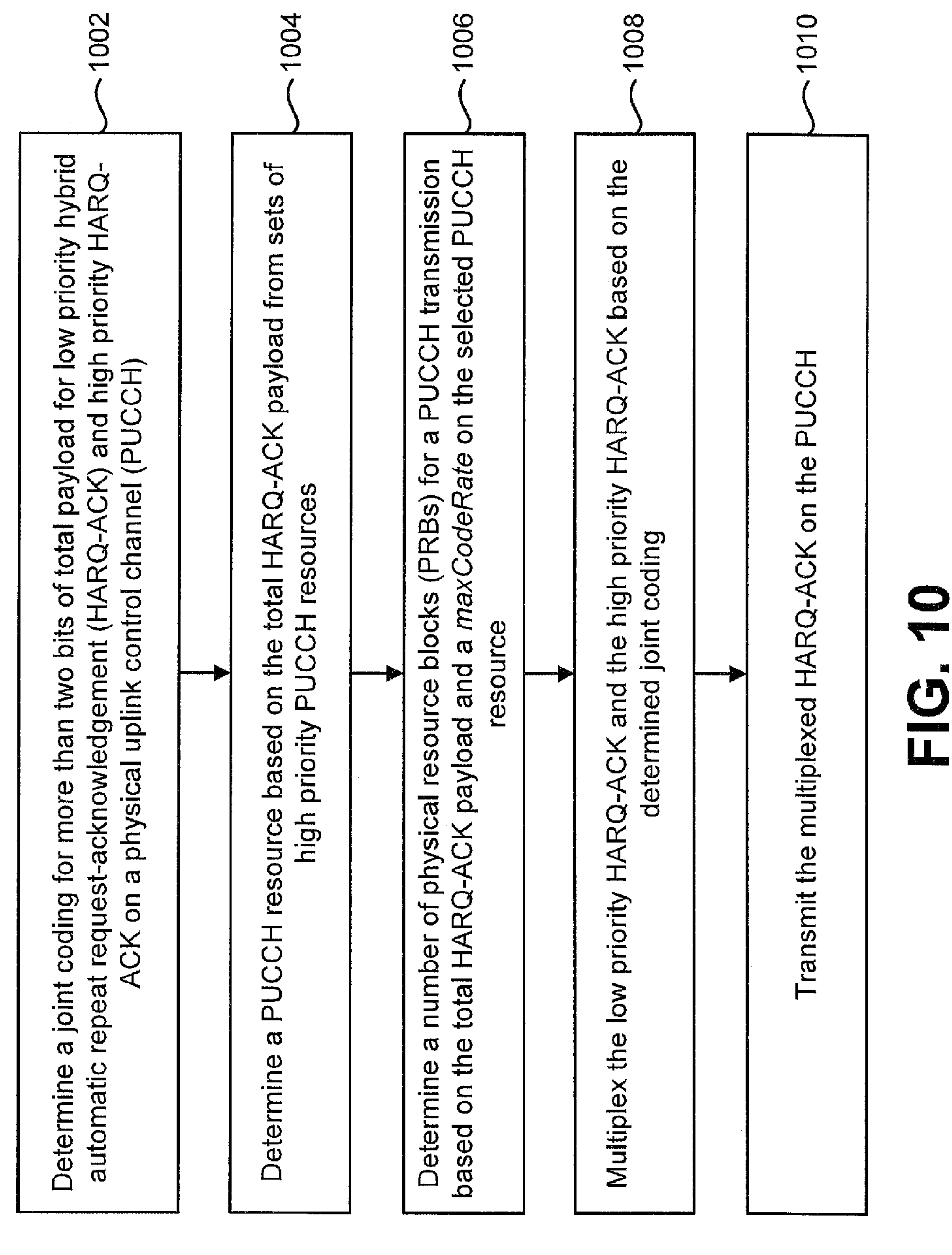
FIG. 10 is a flow diagram illustrating a method by a UE for joint coding and multiplexing of HARQ-ACK with different priorities on PUCCH format 2, PUCCH format 3 or PUCCH format 4.

FIG. 10 is a flow diagram illustrating a method 1000 by a UE 102 for joint coding and multiplexing of HARQ-ACK with different priorities on PUCCH format 2, PUCCH format 3 or PUCCH format 4. The UE 102 may determine 1002 a joint coding for more than two bits of total payload for low priority hybrid automatic repeat request-acknowledgement (HARQ-ACK) and high priority HARQ-ACK on a physical uplink control channel (PUCCH). The UE 102 may determine 1004 a PUCCH resource based on the total HARQ-ACK payload from sets of high priority PUCCH resources. The UE 102 may determine 1006 a number of physical resource blocks (PRBs) for a PUCCH transmission based on the total HARQ-ACK payload and a maxCodeRate on the selected PUCCH resource. The UE 102 may multiplex 1008 the low priority HARQ-ACK and the high priority HARQ-ACK based on the determined joint coding. The UE 102 may transmit 1010 the multiplexed HARQ-ACK on the PUCCH.

In a first approach (Approach 1), if method 1 and method 4 above are used for up to 2 bits of HARQ-ACK codebooks, multiplexing of HARQ-ACK of different priorities with joint coding on PUCCH format 2, PUCCH format 3, or PUCCH format 4 may be performed if the number of bits of any HARQ-ACK codebook is greater than 2 (e.g., $O_{ACK\_1}>2$ and $O_{ACK\_0}>2$).

In a second approach (Approach 2), if method 2 is used for up to 2 bits of HARQ-ACK codebooks, multiplexing of HARQ-ACK of different priorities with joint coding on PUCCH format 2, PUCCH format 3, or PUCCH format 4 may be performed if the total HARQ-ACK payload of different priorities is more than 2 bits (e.g., $$O_{ACK\_1} + O_{ACK\_0} > 2).$$

In a third approach (Approach 3), if method 3 is used for up to 2 bits of HARQ-ACK codebooks, 2 bits may be assumed for up to 2 bits of HARQ-ACK. Thus, HARQ-ACK multiplexing on PUCCH format 2, PUCCH format 3, or PUCCH format 4 may be applied to all HARQ-ACK payload cases. HARQ-ACK multiplexing with different priorities may not be supported if a UE is configured with only one set of PUCCH resources for the high priority HARQ-ACK.

For PUCCH resource determination and multiplexing of HARQ-ACK with different priorities on PUCCH format 2/3/4 and joint coding, a set of PUCCH resources may be determined from the high priority sets of PUCCH resources based on the total payload of high priority HARQ-ACK and low priority HARQ-ACK. If the total payload exceeds maximum payload sizes of all configured high priority PUCCH resources, then in one method, the low priority HARQ-ACK may be dropped. In another method, the payload of low priority HARQ-ACK may be reduced by some bundling methods, and a new joint HARQ-ACK codebook may be generated by concatenating the high priority HARQ-ACK with the low priority HARQ-ACK with reduced payload. The PUCCH resource may be re-selected based on the payload of the new joint HARQ-ACK codebook.

The PUCCH resource may be determined based on the DCI indication from the high priority PDSCH transmissions.

The maxCodeRate configured for the high priority PUCCH in the corresponding PUCCH-Config may be used. Currently, maxCodeRate may be only applicable to UCI multiplexing of different UCI types, HARQ-ACK, SR and CSI. However, maxCodeRate may not be defined for the same UCI type but different priorities.

The number of PRBs for PUCCH transmission of the joint HARQ-ACK with different priorities may be determined based on the total payload size and the maxCodeRate configured for the high priority PUCCH resource. If the UE determines that the number of PRBs to multiplex the joint HARQ-ACK codebook based on the maxCodeRate is more than the configured maximum number of PRBs, then in one approach, the UE may transmit the PUCCH using the configured maximum number of PRBs. In another approach, the UE may choose to drop the low priority HARQ-ACK, and the HARQ-ACK codebook with priority index 1 is reported on a high priority HARQ-ACK PUCCH resource re-selected based on the payload of the high priority HARQ-ACK. In yet another approach, the payload of the low priority HARQ-ACK may be reduced by some bundling methods, and a new joint HARQ-ACK codebook may be generated by concatenating the high priority HARQ-ACK with the low priority HARQ-ACK with reduced payload. The PUCCH resource may be re-selected based on the payload of the new joint HARQ-ACK codebook, and multiplexing may be performed on the new selected PUCCH resource based on the payload and maxCodeRate.

Figure 11:
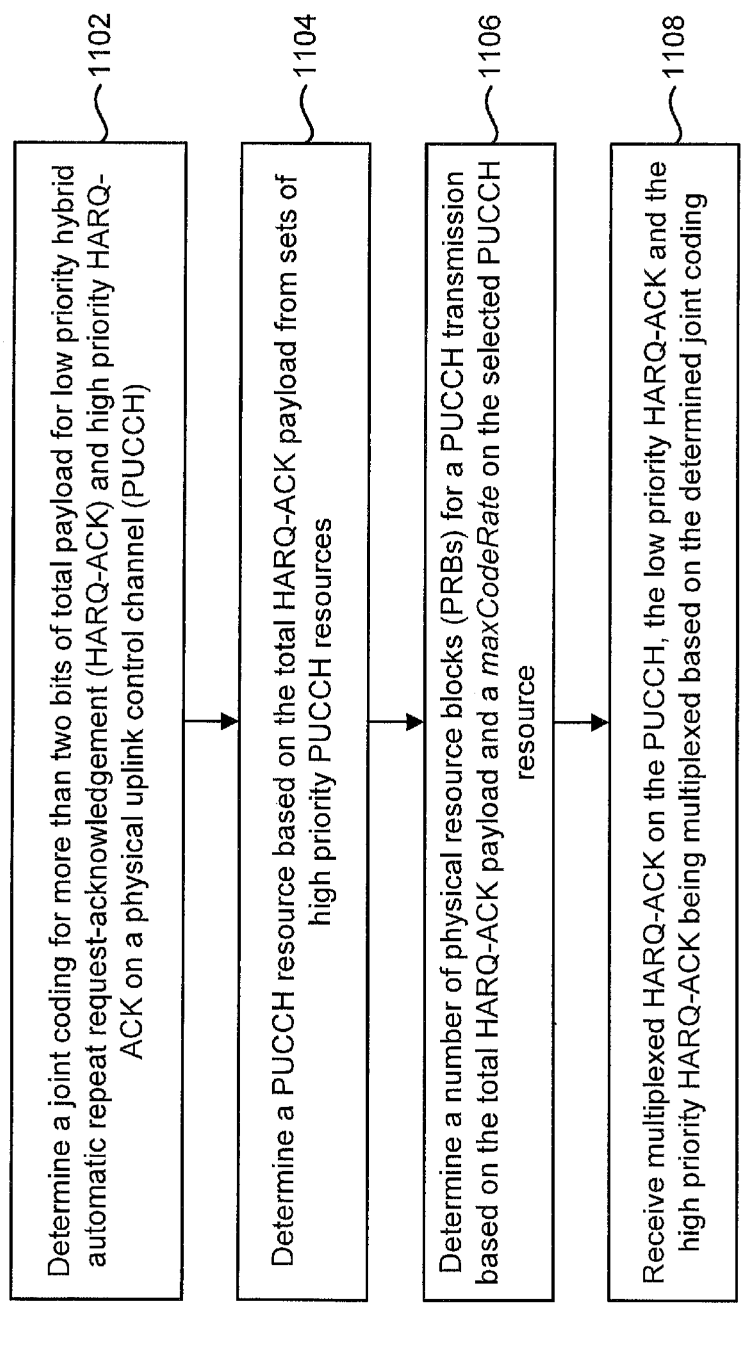
FIG. 11 is a flow diagram illustrating a method by a gNB for joint coding and multiplexing of HARQ-ACK with different priorities on PUCCH format 2, PUCCH format 3 or PUCCH format 4.

FIG. 11 is a flow diagram illustrating a method 1100 by a gNB 160 for joint coding and multiplexing of HARQ-ACK with different priorities on PUCCH format 2, PUCCH format 3 or PUCCH format 4. The gNB 160 may determine 1102 a joint coding for more than two bits of total payload for low priority hybrid automatic repeat request-acknowledgement (HARQ-ACK) and high priority HARQ-ACK on a physical uplink control channel (PUCCH). The gNB 160 may determine 1104 a PUCCH resource based on the total HARQ-ACK payload from sets of high priority PUCCH resources. The gNB 160 may determine 1106 a number of physical resource blocks (PRBs) for a PUCCH transmission based on the total HARQ-ACK payload and a maxCodeRate on the selected PUCCH resource. The gNB 160 may receive 1108 multiplexed HARQ-ACK on the PUCCH. The low priority HARQ-ACK and the high priority HARQ-ACK may be multiplexed based on the determined joint coding.

Figure 12:
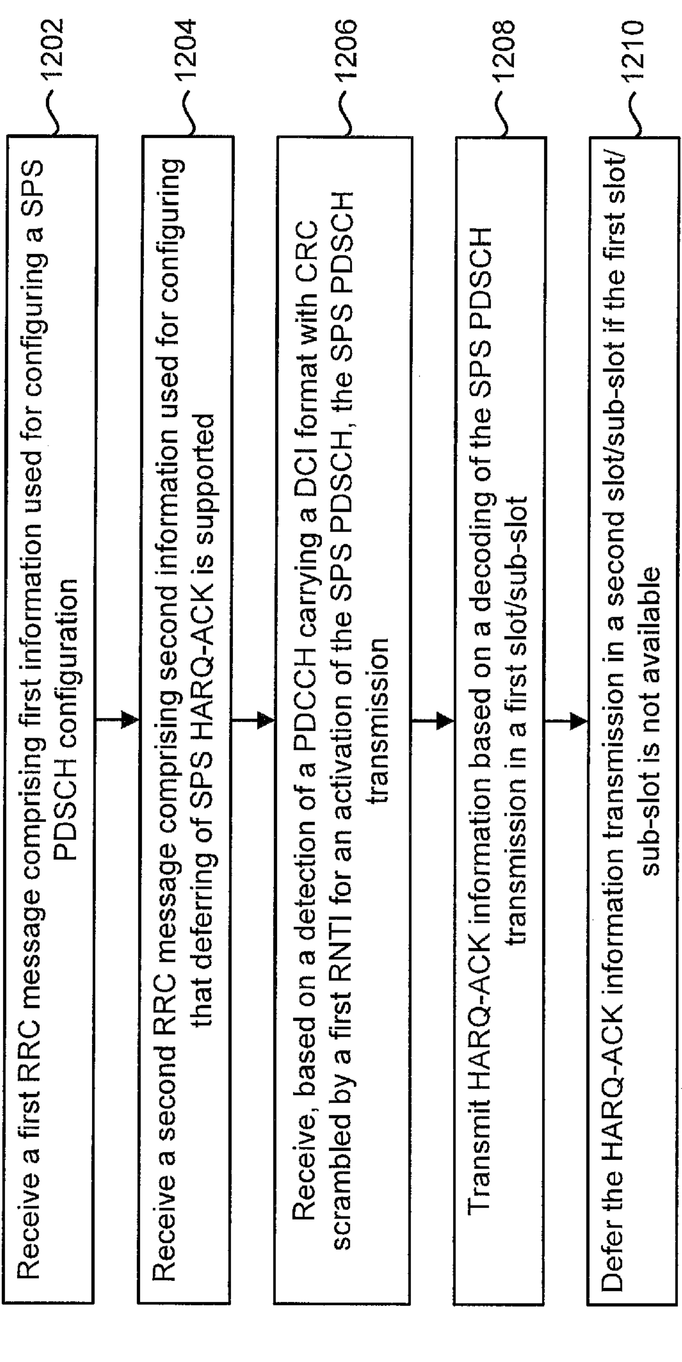
FIG. 12 is a flow diagram illustrating a method 1200 by a UE.

FIG. 12 is a flow diagram illustrating a method 1200 by a UE 102. In some examples, the method 1200 may be performed by the UE 102 described in relation to FIG. 1. The UE 102 may receive 1202 a first RRC message comprising first information used for configuring a SPS PDSCH configuration. The UE 102 may receive 1204 a second RRC message comprising second information used for configuring that deferring of SPS HARQ-ACK is supported. The UE 102 may receive 1206, based on a detection of a PDCCH carrying a DCI format with CRC scrambled by a first RNTI for an activation of the SPS PDSCH, the SPS PDSCH transmission. The UE 102 may transmit 1208 HARQ-ACK information based on a decoding of the SPS PDSCH transmission in a first slot/sub-slot. The UE 102 may defer 1210 the HARQ-ACK information transmission in a second slot/sub-slot if the first slot/sub-slot is not available. In some examples, one or more of the functions, operations, methods, approaches, etc., described herein may be included in the method 1200. In some examples, one or more of the functions, operations, etc., described in relation to the method 1200 may be omitted and/or combined with one or more of the functions operations, methods, approaches, etc., described herein.

Figure 13:
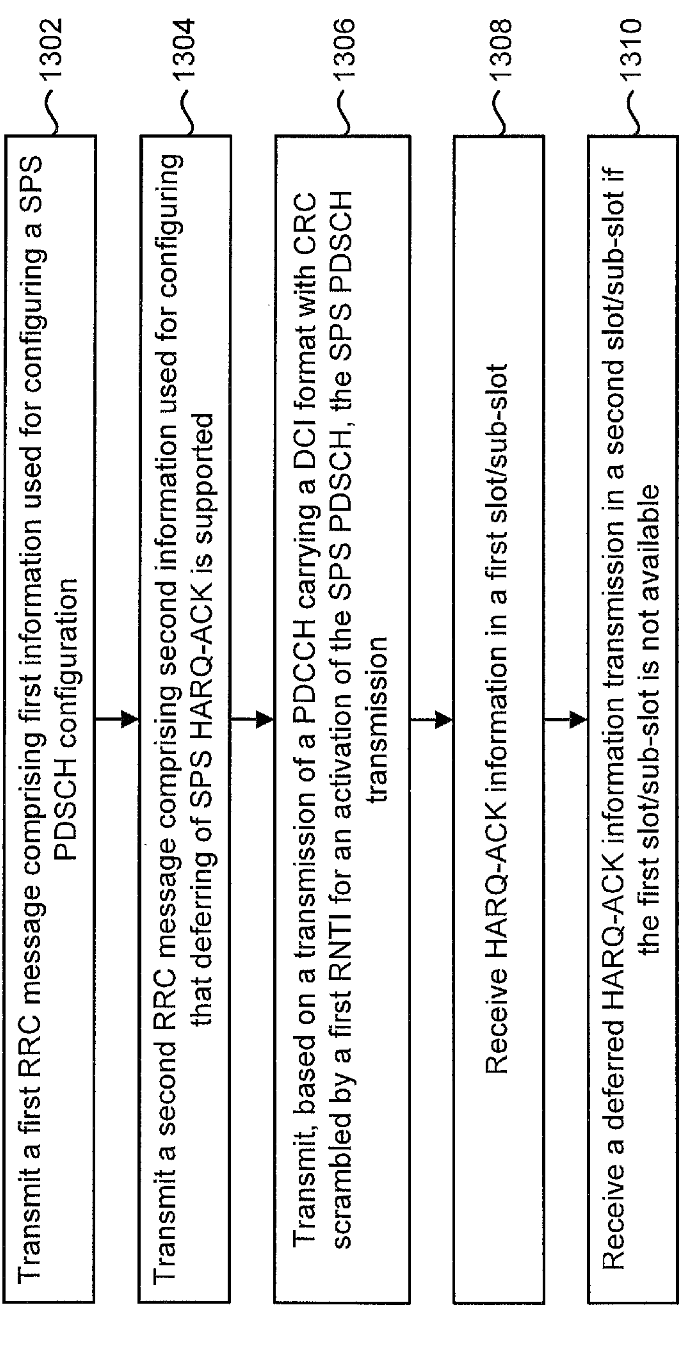
FIG. 13 is a flow diagram illustrating a method 1300 by a gNB.

FIG. 13 is a flow diagram illustrating a method 1300 by a gNB 160. In some examples, the method 1300 may be performed by the gNB 160 described in relation to FIG. 1. The gNB 160 may transmit 1302 a first RRC message comprising first information used for configuring a SPS PDSCH configuration. The gNB 160 may transmit 1304 a second RRC message comprising second information used for configuring that deferring of SPS HARQ-ACK is supported. The gNB 160 may transmit 1306, based on a transmission of a PDCCH carrying a DCI format with CRC scrambled by a first RNTI for an activation of the SPS PDSCH, the SPS PDSCH transmission. The gNB 160 may receive 1308 HARQ-ACK information in a first slot/sub-slot. The gNB 160 may receive 1310 a deferred HARQ-ACK information transmission in a second slot/sub-slot if the first slot/sub-slot is not available. In some examples, one or more of the functions, operations, methods, approaches, etc., described herein may be included in the method 1300. In some examples, one or more of the functions, operations, etc., described in relation to the method 1300 may be omitted and/or combined with one or more of the functions operations, methods, approaches, etc., described herein.

Examples of techniques to prevent SPS HARQ-ACK dropping for TDD operation are described herein. Due to TDD configuration and/or UL/flexible/DL slot/symbol allocation, there may not be corresponding UL and/or flexible symbol(s) for SPS HARQ-ACK transmission.

To address the issue of SPS HARQ-ACK dropping for TDD systems, there may be two options. Option 1 may include deferring HARQ-ACK until a next (e.g., first) available PUCCH. Option 2 may include dynamic triggering of a one-shot/Type-3 CB type of re-transmission. Whether Option 1 and/or Option 2 is applied may be RRC configured and/or dynamically indicated by L1 (e.g., PDCCH, DCI) and/or indicated by MAC CE. The configuration (e.g., RRC) and/or indication (e.g., L1 PDCCH DCI, L2 MAC CE) may be provided per PUCCH cell group and/or per SPS configuration. The configuration (e.g., RRC) and/or indication (e.g., L1 PDCCH DCI, L2 MAC CE) may be jointly or separately provided/configured.

For Option 1 (e.g., deferring HARQ-ACK until a next (e.g., first) available PUCCH), details including the definition of a next (e.g., first) available PUCCH, CB construction/multiplexing, condition of deferring, and/or RRC configurations are described herein. Examples are provided as follows.

There may be several conditions for deferral from within the initial slot. For example (Alt. 1), if SPS HARQ-ACK is multiplexed with any other UCI/dynamic PUCCH resource, then it cannot be deferred. There may be no change to the UCI multiplexing behavior in the initial slot. The other UCI/dynamic PUCCH resource may include HARQ-ACK, SR and/or CSI (e.g., multi-CSI-PUCCH-ResourceList in a higher layer). In yet another example (Alt. 1A), SPS HARQ ACK may be deferred even if multiplexing and transmission based on a PUCCH resource indicator (PRI) in an initial slot would be possible. The UCI multiplexing in the initial slot may be changed. If an SPS HARQ PUCCH resource is overlapping, it may be deferred even though it could still be multiplexed (e.g., due to PRI overriding). In yet another example (Alt. 2), intra-slot deferral may be utilized before inter-slot deferral. If the SPS HARQ-ACK resource is not valid (and there is no multiplexing with other UCI in the slot, for instance), the UE may search and/or determine an alternative PUCCH resource from another PUCCH resource set (e.g., intra-slot deferral). An alternative resource may be from an existing PUCCH resource configuration (e.g., PUCCH_ResourceSet) or another (e.g., newly configured) alternative set for SPS HARQ. In some examples, only if 'intra-slot' deferral is not possible, the UE may consider inter-slot SPS HARQ deferral. In yet another example (Alt. 3), SPS HARQ-ACK may be deferred if there is no available symbol for an UL transmission in the initial slot/sub-slot. There may be no change to UCI multiplexing in the initial slot. Whether and/or which alternative(s) is applied may be RRC configured and/or dynamically indicated by L1 (e.g., PDCCH, DCI) and/or indicated by MAC CE.

There may be different examples (e.g., definitions) of a next available PUCCH and/or determination of valid symbols in the initial slot/sub-slot. Semi-statically configured flexible symbols may or may not be taken into account for PUCCH availability. Additionally or alternatively, synchronization signal block (SSB) may or may not be taken into account for PUCCH availability. Additionally or alternatively, CORESET #0 may or may not be taken into account for PUCCH availability. Additionally or alternatively, a demodulation reference signal (DMRS) and/or any other reference signal may or may not be taken into account for PUCCH availability. Additionally or alternatively, configuration of monitoring for DCI format 2_0/SFI may or may not be taken into account for PUCCH availability determination (e.g., whether semi-statically configured flexible symbols are taken into account for PUCCH availability may depend on the configuration of monitoring for DCI format 2_0/SFI.). If DCI format 2_0 is not configured to be monitored, semi-statically configured flexible symbols may not be taken into account for PUCCH availability. If DCI format 2_0 is configured to be monitored, semi-statically configured flexible symbols may be taken into account for PUCCH availability based on dynamic SFI and/or processing timeline. For example, for SPS HARQ-ACK deferral, for the determination of valid symbols in the initial slot/sub-slot a collision with semi-static DL symbols, SSB and CORESET #0 may be regarded as 'invalid' or 'no symbols for UL transmission'. In some examples, the next available PUCCH may use SPS-PUCCH-AN-List-r16 resources only. Additionally or alternatively, the next available PUCCH may use PUCCH resources from sps-PUCCH-AN-List-r16 and PUCCH-ResourceSet. Additionally or alternatively, the next available PUCCH may use multi-CSI-PUCCH-ResourceList. Additionally or alternatively, additional PUCCH resources for deferring (including a potentially separate k1, for instance) may be configured for SPS HARQ-ACK deferring.

In some examples, the next available PUCCH resource determination in a slot/sub-slot may consider the PUCCH resources with the same priority index as the deferred SPS HARQ-ACK only if there is no overlap with other PUCCH transmissions. In some examples, the available PUCCH resource determination in a slot/sub-slot may consider the PUCCH resources with the same priority index or different priority index as the deferred SPS HARQ-ACK if there is overlap with other PUCCH transmissions with the same or different priority index.

In some approaches, one or more restrictions on the deferral may be utilized. k1 may denote the slot/sub-slot offset for the SPS HARQ as given by the SPS activation DCI (based on a definition of k1, for instance). $k1_{def}$ may denote the slot/sub-slot offset of the deferral (e.g., slot offset between the initial, dropped PUCCH/HARQ and the slot of the deferred PUCCH/HARQ transmission). $k1_{eff}$ may denote the effective PDSCH to HARQ-ACK feedback offset (in slots/sub-slots) for the deferred HARQ (e.g., $k1_{eff}=k1+k1_{def}$). For SPS HARQ-ACK, the deferral from the initial slot/sub-slot determined by k1 in the activation DCI to the target slot/sub-slot determined by $k1+k1_{def}$, the UE may check the validity of a target slot/sub-slot evaluating from one slot/sub-slot to the next slot/sub-slot (e.g., the granularity of $k1_{def}$ may be 1 slot/sub-slot). The unit of $k1_{def}$ (and/or $k1_{eff}$) may be a slot, sub-slot, or symbol. In some examples, the unit of $k1_{def}$ (and/or $k1_{eff}$) may be determined by the unit of k1 (e.g., if k1 is slot-based, $k1_{def}$ (and/or $k1_{eff}$) may be slot-based; if k1 is sub-slot-based, $k1_{def}$ (and/or $k1_{eff}$) may be subslot-based). Whether $k1_{def}$ (and/or $k1_{eff}$) is sub-slot-based or slot-based or symbol-based may be configured by RRC and/or indicated in a specification (e.g., a default selection in a specification). Whether $k1_{def}$ (and/or $k1_{eff}$) is sub-slot-based or slot-based or symbol-based may be determined by an initial PUCCH resource configuration of the SRS HARQ-ACK. $k1_{def}$ (and/or $k1_{eff}$) granularity may be 1 slot/sub-slot or another value(s). In some examples, there may be a limit on the minimum deferral considered by UE processing ($k1_{def}>0$). The minimum value of $k1_{def}$ (and/or $k1_{eff}$) may be configured by RRC and/or indicated in a specification (e.g., a default value in a specification). In some examples, there may be a limit on the maximum deferral. The maximum value of $k1_{def}$ (and/or $k1_{eff}$) may be configured by RRC and/or indicated in a specification (e.g., a default value in a specification). In some examples, the maximum value of $k1_{def}$ (and/or $k1_{eff}$) may be determined by the periodicity for the corresponding SPS. The maximum value of $k1_{def}$ (and/or $k1_{eff}$) may be determined by a configured K1 set (e.g., maximum k1 value of a configured K1 set). In some examples, the value of $k1_{def}$ (and/or $k1_{eff}$) may be determined by the next available PUCCH. In some approaches, the value of $k1_{def}$ (and/or $k1_{eff}$) may be larger than (and/or equal to) the minimal value mentioned above and/or may be less than (and/or equal to) the maximal value mentioned above. Additionally or alternatively, $k1_{eff}$ may be limited to an existing k1 entry and/or value of the K1 set(s).

In some approaches, determining the target slot/sub-slot of the deferral may be performed as described above on the available PUCCH resource and/or referral delay requirements. Once the next available PUCCH resource is determined in the target slot/sub-slot, performing the deferred SPS HARQ-ACK reporting may be performed as described below. For example (Alt. 1), only deferred SPS HARQ codebook size may be taken into account, using an SPS PUCCH resource or normal PUCCH resource (e.g., SPS-PUCCH-AN-List-r16 or n1PUCCH-AN). In yet another example (Alt. 2), only deferred SPS HARQ codebook size may be taken into account, using SPSPUCCH-AN-List-r16, n1PUCCH-AN or other configured PUCCH resources (e.g., PUCCH-ResourceSet, multi-CSI-PUCCH-ResourceList). In yet another example (Alt. 3), deferred SPS HARQ and initial/normal/non-deferred (SPS or dynamic grant (DG)) HARQ may be taken into account, using SPS PUCCH resource or normal PUCCH resource (e.g., SPS-PUCCH-AN-List-r16, n1PUCCH-AN or PUCCH-ResourceSet).

For multiplexing of deferred SPS HARQ-ACK with other UCI, there may be several methods/alternatives that may be utilized and/or implemented. For example (Alt. 1), multiplexing of deferred SPS HARQ-ACK with any other UCI may not be supported. For instance, if there is a collision between the SPS HARQ-ACK and another UCI, one of them may be dropped based on priority rules. In yet another example (Alt. 2), multiplexing of deferred SPS HARQ-ACK with non-deferred SPS HARQ-ACK may be supported. In yet another example (Alt. 3), multiplexing of deferred SPS HARQ-ACK with non SPS HARQ-ACK may be supported. In yet another example (Alt. 4), multiplexing of deferred SPS HARQ-ACK with SR/LLR may be supported. In yet another example (Alt. 5), multiplexing of deferred SPS HARQ-ACK with CSI on PUCCH may be supported. Whether/which alternative(s) is applied may be RRC configured, and/or dynamically indicated by L1 (e.g., PDCCH, DCI), and/or indicated by MAC CE, and/or indicated in a specification (e.g., a default behavior may be indicated in a specification).

For joint coding of deferred SPS HARQ-ACK with other UCI, there may be several methods/alternatives that may be utilized and/or implemented. For example (Alt. 1), joint coding of deferred SPS HARQ-ACK with any other UCI may not be supported. In yet another example (Alt. 2), joint coding of deferred SPS HARQ-ACK with non-deferred SPS HARQ-ACK may be supported. In yet another example (Alt. 3), joint coding of deferred SPS HARQ-ACK with non SPS HARQ-ACK may be supported. In yet another example (Alt. 4), joint coding of deferred SPS HARQ-ACK with SR/LLR may be supported. In yet another example (Alt. 5), joint coding of deferred SPS HARQ-ACK with CSI on PUCCH may be supported. Whether/which alternative(s) is applied may be RRC configured, and/or dynamically indicated by L1 (e.g., PDCCH, DCI), and/or indicated by MAC CE, and/or indicated in a specification (e.g., a default behavior may be indicated in a specification).

In some approaches, priority handling of deferred SPS HARQ-ACK may be taken into account. Examples of how to determine the priority of deferred SPS HARQ-ACK are provided as follows. For instance, the priority of deferred SPS HARQ-ACK may be determined by the priority of an original SPS HARQ-ACK. For example, the priority of deferred SPS HARQ-ACK may be determined by a corresponding SPS PDSCH transmission. In yet another example, the deferred SPS HARQ-ACK may be treated with high priority (e.g., priority index 1). In yet another example, the deferred SPS HARQ-ACK may be treated with low priority (e.g., priority index 0). In yet another example, the priority of deferred SPS HARQ-ACK may be separately RRC configured, and/or dynamically indicated by L1 (e.g., PDCCH, DCI), and/or indicated by MAC CE, and/or indicated in a specification (e.g., a default behavior may be indicated in a specification). If the priority of a deferred SPS HARQ-ACK is not provided/configured/indicated, a default priority (e.g., high priority or low priority) may be assumed for the deferred SPS HARQ-ACK.

After determining the priority of the deferred SPS HARQ-ACK, the methods/approaches of joint coding and/or multiplexing mentioned above can be also applied to the joint coding and/or multiplexing of the deferred SPS HARQ-ACK and other UCI (e.g., regular/normal/non-deferred HARQ-ACK, non-deferred SPS HARQ-ACK, non SPS HARQ-ACK, SR/LLR, and/or CSI on PUCCH/PUSCH). For instance, one or more of the aforementioned approaches and/or examples may be utilized for joint coding and/or multiplexing of deferred SPS HARQ-ACK and/or other UCI.

Additionally or alternatively, one or more methods can be utilized for reporting of up to 2 bits of HARQ-ACK for deferred SPS HARQ-ACK with high priority and the normal HARQ-ACK (e.g., non-deferred SPS HARQ-ACK, non SPS HARQ-ACK) with high priority. For example, HARQ- ACK multiplexing with bundling may be applied within the same HARQ-ACK. In this approach, HARQ-ACK bundling may be applied in case of 2 bits of HARQ-ACK in a codebook so that the total number of HARQ-ACK bits is kept as 2 bits.

For multiplexing of 1 bit of high priority deferred SPS HARQ-ACK and 1 bit of high priority normal HARQ-ACK, the high priority normal HARQ-ACK can be appended to the high priority deferred SPS HARQ-ACK. In yet another design, the high priority deferred HARQ-ACK can be appended to the high priority normal HARQ-ACK. The joint HARQ-ACK may have 2 bits and may be reported on a high priority PUCCH resource with PUCCH format 0 or PUCCH format 1.

In some approaches for multiplexing 1 bit of high priority deferred SPS HARQ-ACK and 2 bits of high priority normal HARQ-ACK, the 2 bits of high priority normal HARQ-ACK can be bundled into 1 bit first by an AND function. Thus, the bits 00, 01, and 10 may be bundled as 0, and bits 11 may be bundled as 1. The bundled high priority normal HARQ-ACK bit may then be appended to the high priority deferred SPS HARQ-ACK. In yet another example, the high priority deferred SPS HARQ-ACK bit may then be appended to the bundled high priority normal HARQ-ACK. The joint HARQ-ACK may have 2 bits and may be reported on a high priority PUCCH resource with PUCCH format 0 or format 1.

In some approaches for multiplexing 2 bits of high priority deferred SPS HARQ-ACK and 1 bit of high priority normal HARQ-ACK, the 2 bits of high priority deferred SPS HARQ-ACK can be bundled into 1 bit first by an AND function. The high priority normal HARQ-ACK bit may then be appended to the bundled high priority deferred SPS HARQ-ACK. In yet another example, the bundled high priority deferred SPS HARQ-ACK bit may then be appended to the high priority normal HARQ-ACK. The joint HARQ-ACK may have 2 bits and may be reported on a high priority PUCCH resource with PUCCH format 0 or format 1.

In some approaches for multiplexing 2 bits of high priority deferred HARQ-ACK and 2 bits of high priority normal HARQ-ACK, the 2 bits of high priority deferred SPS HARQ-ACK can be bundled into 1 bit by an AND function. And the 2 bits of high priority normal HARQ-ACK may be bundled into 1 bit by an AND function. The bundled high priority normal HARQ-ACK bit may then be appended to the bundled high priority deferred SPS HARQ-ACK. In yet another example, the bundled high priority deferred SPS HARQ-ACK bit may then be appended to the bundled high priority normal HARQ-ACK. The joint HARQ-ACK may have 2 bits and may be reported on a high priority PUCCH resource with PUCCH format 0 or format 1.

Considering more than 2 bits of total payloads using PUCCH format 2/3/4 selected from a high priority PUCCH resource, methods/approaches/alternatives for multiplexing and/or joint coding (or separate coding) described in this disclosure may also be applied. For instance, one or more of the approaches described herein may be utilized for more than 2 bits of total payloads using PUCCH format 2, 3, or 4 selected from a high priority PUCCH resource.

In some examples, HARQ-ACK multiplexing with bundling may be applied across the deferred SPS HARQ-ACK and the normal HARQ-ACK. In some approaches for multiplexing 1 bit of high priority deferred SPS HARQ-ACK and 2 bits of high priority normal HARQ-ACK, the 1 bit high priority deferred SPS HARQ-ACK may be bundled into the first bit of high priority normal HARQ-ACK. The second bit of high priority normal HARQ-ACK may then be appended. In another example, the 1 bit high priority deferred SPS HARQ-ACK may be bundled into the second bit of high priority normal HARQ-ACK. The bundled bit may then be appended to the first bit of high priority normal HARQ-ACK.

In some approaches for multiplexing 2 bits of high priority deferred SPS HARQ-ACK and 1 bit of high priority normal HARQ-ACK, the 1 bit high priority normal HARQ-ACK may be bundled into the first bit of high priority deferred SPS HARQ-ACK. The second bit of high priority deferred SPS HARQ-ACK may then be appended. In some examples, the 1 bit high priority normal HARQ-ACK may be bundled into the second bit of high priority deferred SPS HARQ-ACK. The bundled bit may then be appended to the first bit of high priority deferred SPS HARQ-ACK.

In some approaches for multiplexing 2 bits of high priority deferred SPS HARQ-ACK and 2 bits of high priority normal HARQ-ACK, the first bit of high priority deferred SPS HARQ-ACK and the first bit of high priority normal HARQ-ACK may be bundled into a first bundled bit. The second bit of high priority deferred SPS HARQ-ACK and the second bit of high priority normal HARQ-ACK may be bundled into a second bundled bit. The first bundled bit and the second bundled bit may be concatenated into 2 bits.

Additionally or alternatively, one or more methods can be utilized for reporting of up to 2 bits of HARQ-ACK for deferred SPS HARQ-ACK with low priority and the normal HARQ-ACK (e.g., non-deferred SPS HARQ-ACK, non SPS HARQ-ACK) with low priority. For example, HARQ-ACK multiplexing with bundling may be applied within the same HARQ-ACK. In these approaches, HARQ-ACK bundling may be applied in case of 2 bits of HARQ-ACK in a codebook so that the total number of HARQ-ACK bits is kept as 2 bits.

In some approaches for multiplexing 1 bit of low priority deferred SPS HARQ-ACK and 1 bit of low priority normal HARQ-ACK, the low priority normal HARQ-ACK can be appended to the low priority deferred SPS HARQ-ACK. In yet another example, the low priority deferred HARQ-ACK may be appended to the low priority normal HARQ-ACK. The joint HARQ-ACK may have 2 bits and may be reported on a PUCCH resource with PUCCH format 0 or PUCCH format 1.

In some approaches for multiplexing 1 bit of low priority deferred SPS HARQ-ACK and 2 bits of low priority normal HARQ-ACK, the 2 bits of low priority normal HARQ-ACK can be bundled into 1 bit first by an AND function. Thus, the bits 00, 01, and 10 may be bundled as 0, and bits 11 may be bundled as 1. The bundled low priority normal HARQ-ACK bit may then be appended to the low priority deferred SPS HARQ-ACK. In yet another example, the low priority deferred SPS HARQ-ACK bit may then be appended to the bundled low priority normal HARQ-ACK. The joint HARQ-ACK may have 2 bits and may be reported on a PUCCH resource with PUCCH format 0 or format 1.

In some approaches for multiplexing 2 bits of low priority deferred SPS HARQ-ACK and 1 bit of low priority normal HARQ-ACK, the 2 bits of low priority deferred SPS HARQ-ACK can be bundled into 1 bit first by an AND function. The low priority normal HARQ-ACK bit may then be appended to the bundled low priority deferred SPS HARQ-ACK. In yet another example, the bundled low priority deferred SPS HARQ-ACK bit may then be appended to the low priority normal HARQ-ACK. The joint HARQ-ACK may have 2 bits and may be reported on a PUCCH resource with PUCCH format 0 or format 1.

In some approaches for multiplexing 2 bits of low priority deferred HARQ-ACK and 2 bits of low priority normal HARQ-ACK, the 2 bits of low priority deferred SPS HARQ-ACK can be bundled into 1 bit by an AND function. And the 2 bits of low priority normal HARQ-ACK may be bundled into 1 bit by an AND function. The bundled low priority normal HARQ-ACK bit may then be appended to the bundled low priority deferred SPS HARQ-ACK. In yet another example, the bundled low priority deferred SPS HARQ-ACK bit may then be appended to the bundled low priority normal HARQ-ACK. The joint HARQ-ACK may have 2 bits and may be reported on a PUCCH resource with PUCCH format 0 or format 1.

In yet another example, HARQ-ACK multiplexing with bundling may be applied across the deferred SPS HARQ-ACK and the normal HARQ-ACK.

In some approaches for multiplexing 1 bit of low priority deferred SPS HARQ-ACK and 2 bits of low priority normal HARQ-ACK, the 1 bit low priority deferred SPS HARQ-ACK may be bundled into a first bit of low priority normal HARQ-ACK. The second bit of low priority normal HARQ-ACK may then be appended. Alternatively, the 1 bit low priority deferred SPS HARQ-ACK may be bundled into the second bit of low priority normal HARQ-ACK. The bundled bit may then be appended to the first bit of low priority normal HARQ-ACK.

In some approaches for multiplexing 2 bits of low priority deferred SPS HARQ-ACK and 1 bit of low priority normal HARQ-ACK, the 1 bit low priority normal HARQ-ACK may be bundled into a first bit of low priority deferred SPS HARQ-ACK. The second bit of low priority deferred SPS HARQ-ACK may then be appended. Alternatively, the 1 bit low priority normal HARQ-ACK may be bundled into the second bit of low priority deferred SPS HARQ-ACK. The bundled bit may then be appended to the first bit of low priority deferred SPS HARQ-ACK.

In some approaches for multiplexing 2 bits of low priority deferred SPS HARQ-ACK and 2 bits of low priority normal HARQ-ACK, the first bit of low priority deferred SPS HARQ-ACK and the first bit of low priority normal HARQ-ACK may be bundled into a first bundled bit. The second bit of low priority deferred SPS HARQ-ACK and the second bit of low priority normal HARQ-ACK may be bundled into a second bundled bit. The first bundled bit and the second bundled bit may be concatenated into 2 bits.

In some approaches for multiplexing low priority deferred SPS HARQ-ACK and high priority normal HARQ-ACK, one or more of the methods and/or approaches described above may be used. For instance, one or more of the methods, approaches, and/or examples described above may be utilized for multiplexing low priority deferred SPS HARQ-ACK and high priority normal HARQ-ACK.

In some approaches for multiplexing high priority deferred SPS HARQ-ACK and low priority normal HARQ-ACK, one or more of the methods and/or approaches described above may be used. For instance, one or more of the methods, approaches, and/or examples described above may be utilized for multiplexing high priority deferred SPS HARQ-ACK and low priority normal HARQ-ACK.

In some approaches for multiplexing deferred SPS HARQ-ACK and other UCI (e.g., SR, CSI), one or more of the methods, approaches, and/or examples described above may be used. For instance, one or more of the methods, approaches, and/or examples described above may be utilized for multiplexing deferred SPS HARQ-ACK and other UCI.

In some examples, whether and/or which method(s), approach(es), example(s), etc., described above is applied may be RRC configured, and/or dynamically indicated by L1 (e.g., PDCCH, DCI), and/or indicated by MAC CE, and/or indicated in a specification (e.g., a default behavior may be indicated in a specification).

In some approaches for joint coding and/or multiplexing of the deferred SPS HARQ-ACK and other UCI (e.g., regular/normal/non-deferred HARQ-ACK, non-deferred SPS HARQ-ACK, non SPS HARQ-ACK, SR/LLR, and/or CSI on PUCCH/PUSCH), ordering may be defined. In some examples, the ordering may depend on the timing of corresponding transmission, e.g., the deferred SPS HARQ-ACK is taken into account and/or processed before the normal HARQ-ACK, or the normal HARQ-ACK is appended to the deferred SPS HARQ-ACK. In some examples, the deferred SPS HARQ-ACK may be appended to the normal/non-deferred HARQ-ACK codebook. In some examples, whether and/or which ordering method(s), approach(es), and/or example(s), etc., is applied may be RRC configured, and/or dynamically indicated by L1 (e.g., PDCCH, DCI), and/or indicated by MAC CE, and/or indicated in a specification (e.g., a default behavior may be indicated in a specification).

Some examples of an order of multiplexing and deferral determination are described as follows. For instance, deferral may be performed before a multiplexing decision (e.g., the decision on the target slot of the deferral may not take the multiplexing into account). In yet another example, the deferral decision may take the multiplexing in the target slot into account. In some examples, whether and/or which ordering method(s), approach(es), example(s), etc., is applied may be RRC configured, and/or dynamically indicated by L1 (e.g., PDCCH, DCI), and/or indicated by MAC CE, and/or indicated in a specification (e.g., a default behavior may be indicated in a specification).

In some approaches for the deferred SPS HARQ-ACK and the normal HARQ-ACK (e.g., non-deferred SPS HARQ-ACK, non SPS HARQ-ACK) with the same priority, joint coding may be used. In some approaches for the deferred SPS HARQ-ACK and the normal HARQ-ACK (e.g., non-deferred SPS HARQ-ACK, non SPS HARQ-ACK) with the different priorities, separate coding may be utilized (e.g., may be an option besides joint coding). Whether joint coding or separate coding is applied may be RRC configured, and/or dynamically indicated by L1 (e.g., PDCCH, DCI), and/or indicated by MAC CE, and/or indicated in a specification (e.g., a default behavior may be indicated in a specification).

In some approaches for codebook generation, the deferred SPS HARQ-ACK and normal HARQ-ACK may be multiplexed in the same HARQ-ACK codebook if their timings point to the same slot/sub-slot. In some examples, deferred SPS HARQ-ACK may have a different timing indication, and postponed, may use a separate codebook (e.g., may basically use a separate codebook). In some examples, two codebooks with the same priority may be maintained at the same time. In some examples, multiplexing may be considered as maintaining only one codebook.

One or more approaches may be utilized to configure Option 1. For example, the deferring of SPS HARQ-ACK dropped due to TDD specific collisions may be configured by RRC per PUCCH cell group (e.g., a higher layer parameter SP-SACK-defer included in PUCCH RRC configuration PUCCH-config may indicate whether the deferring of SPS HARQ-ACK dropped due to TDD specific collisions is used or not). In yet another example, the deferring of SPS HARQ-ACK dropped due to TDD specific collisions may be configured by RRC per SPS configuration (e.g., a higher layer parameter SPS-ACK-defer included in SPS RRC configuration SPS-config may indicate whether the deferring of SPS HARQ-ACK dropped due to TDD specific collisions is used or not).

The SPS HARQ-ACK deferral may be enabled per SPS configuration. For example, gNB may send UE a dedicated RRC message/signaling (e.g., IE sps-config) including a parameter(s) to indicate whether SPS HARQ-ACK deferral is enabled or not for a corresponding SPS configuration (a configuration index for the corresponding SPS may also be provided by the dedicated RRC message/signaling (e.g., IE sps-config).). Only HARQ-ACK of SPS PDSCH configurations enabled for deferral is in principle subject to deferral.

For SPS HARQ-ACK deferral, the maximum deferral value in terms of $k1+k1_{def}$ is RRC configured per SPS configuration. For example, gNB may send UE a dedicated RRC message/signaling (e.g., IE sps-config) including a parameter(s) to indicate the maximum deferral value in terms of $k1+k1_{def}$ for a corresponding SPS configuration (a configuration index for the corresponding SPS may also be provided by the dedicated RRC message/signaling (e.g., IE sps-config).). The maximum deferral value may be in unit of slot, subslot or symbol. The maximum deferral value may be related to k1. For example, the maximum deferral value may be multiple(s) of k1 value(s), e.g., N times maximum value from k1 set (or any k1 value from the k1 set). The maximum deferral value may be selected from a set of values. The maximum deferral value may reuse the maximum value of k1, i.e., RRC value range is {1 . . . 15}. The parameter indicating the maximum deferral value may use up to 4 (5, 6, 7 and so on) bits to provide RRC value range is {1 . . . 16 (32, 64, 128 and so on)} or N (e.g., 2, 3, 4 and so on) times {1 . . . 16 (32, 64, 128 and so on)}. The parameter indicating the maximum deferral value may indicate the factor N.

Definition of when to defer from the initial slot is if the SPS HARQ-ACK in the initial slot/sub-slot cannot be transmitted as the resulting PUCCH resource for transmission using the PUCCH by SPS-PUCCH-AN-List-r16 or n1PUCCH-AN is not valid. For SPS HARQ-ACK deferral, the operation in the 'initial' slot is further clarified as: The UE performs first the (Rel-16) UCI multiplexing operation. If after the UCI multiplexing operation into a PUCCH or PUSCH if any, and if the UE would be transmitting SPS HARQ-ACK using the PUCCH SPS-PUCCH-AN-List-r16 or n1PUCCH-AN which is not valid, the SPS HARQ-ACK configured for deferral is deferred.

For SPS HARQ-ACK deferral, the target PUCCH slot is defined as the next PUCCH slot, where after performing the (Rel-16) UCI multiplexing operation into a PUCCH or PUSCH if any, the UE would be either (i) transmitting HARQ-ACK using a PUCCH/PUSCH other than the PUCCH determined from PUCCH SPS-PUCCH-AN-List-r16 or n1PUCCH-AN or (ii) would be transmitting HARQ-ACK using a PUCCH resource configured in PUCCH SPS-PUCCH-AN-List-r16 or n1PUCCH-AN being regarded as valid. The target PUCCH slot determination is based on the total HARQ-ACK payload size including deferred SPS HARQ-ACK information and non-deferred HARQ-ACK information (if any) of a candidate target PUCCH slot. The final PUCCH resource selection in the target PUCCH slot in terms of PUCCH resource set and PUCCH resource ID follows the Rel-16 procedures.

For SPS HARQ-ACK deferral, only SPS HARQ bits subject to deferral from HARQ-ACK codebook from an initial PUCCH slot may be deferred to the target PUCCH slot. For SPS HARQ-ACK deferral, deferred SPS HARQ bits from more than one 'initial PUCCH slot' may be jointly deferred to a target PUCCH slot. For SPS HARQ-ACK deferral, if after the target PUCCH slot determination the deferred SPS HARQ-ACK cannot be transmitted, the deferred SPS HARQ-ACK bits may not be further deferred and may be dropped. For SPS HARQ-ACK deferral, in the target PUCCH slot the deferred SPS HARQ-ACK bits may be appended to the initial HARQ bits/Type 1 or Type 2 codebook.

For SPS HARQ-ACK deferral, to handle the collision for the same HARQ process due to deferred SPS HARQ-ACK the following behavior may to be specified: In case the UE is expected to receive PDSCH of a certain HARQ Process ID according to TS 38.214 Sec. 5.1, the deferred SPS HARQ bit(s) for this HARQ Process ID are dropped.

For SPS HARQ-ACK deferral, only SPS HARQ-ACK bits subject to deferral from one or more initial slots which have not reached the maximum deferral value are jointly deferred to the next available PUCCH (other SPS HARQ-ACK is dropped). For SPS HARQ-ACK deferral, the bit ordering of deferred SPS HARQ-ACK information from one or more initial slots in the target PUCCH slot is based on the Rel. 16 SPS HARQ-ACK bit order principle as in clause 9.1.2 of TS38.213 is applied, i.e., based on serving cell index, SPS configuration index, SPS PDSCH slot index.

If the UE is not configured with Rel-17 Intra-UE multiplexing, SPS HARQ for deferral of different PHY priorities can be separately deferred with the target PUCCHs separately determined according to their respective PHY priorities. If the UE is configured with Rel-17 Intra-UE multiplexing, SPS HARQ for deferral of different PHY priorities may be also separately deferred with the target PUCCHs separately determined according to their respective PHY priorities (Deferral Option 1). In yet another design (Deferral Option 2), if the UE is configured with Rel-17 Intra-UE multiplexing, SPS HARQ-ACK feedback(s) for deferral of different PHY priorities may be treated same as other HARQ-ACK feedbacks(s) (e.g., HARQ-ACK feedback without deferral) with corresponding PHY priorities and then follow Rel-17 Intra-UE multiplexing. In yet another design (Deferral Option 3), if the UE is configured with Rel-17 Intra-UE multiplexing, SPS HARQ-ACK feedback (s) for deferral of different PHY priorities may be treated as low priority and then follow Rel-17 Intra-UE multiplexing. In yet another design (Deferral Option 4), if the UE is configured with Rel-17 Intra-UE multiplexing, SPS HARQ-ACK feedback(s) for deferral of different PHY priorities may be treated as high priority and then follow Rel-17 Intra-UE multiplexing. Which Deferral Option to be applied may be RRC configured. For example, gNB may send UE a dedicated RRC message/signaling including a parameter(s) to indicate which deferral behavior (e.g., Deferral Option 1, Deferral Option 2, Deferral Option 3, Deferral Option 4) is applied or whether Deferral Option 1 (Deferral Option 2, Deferral Option 3, Deferral Option 4) is applied or not.

Sub-slot based PUCCH repetition for HARQ-ACK may be supported. Rel-16 PUCCH procedure for slot-based PUCCH may be applied to sub-slot based PUCCH. Dynamic repetition indication may be also supported for sub-slot based PUCCH in Rel-17. The dynamic repetition indication solution for slot-based PUCCH repetition from coverage enhancement work item may be directly applied for dynamic repetition indication for sub-slot based PUCCH repetition.

For sub-slot based PUCCH repetition for HARQ-ACK, semi-static configured PUCCH repetition (i.e. using RRC parameter nrofSlots) and dynamic repetition factor based operation may be supported. Sub-slot based PUCCH repetition based on semi-static configuration (i.e. using RRC parameter nrofSlots) and based on dynamic indication may be subject to separate UE capabilities. UE may be provided by a dedicated capability message/signaling (or report through a capability message/signaling) and/or RRC message/signaling/parameter indicating whether sub-slot based PUCCH repetition based on semi-static configuration (i.e. using RRC parameter nrofSlots) is supported or not. UE may be provided by a dedicated capability message/signaling (or report through a capability message/signaling) and/or RRC message/signaling/parameter indicating whether sub-slot based PUCCH repetition based on dynamic indication is supported or not.

To align with Rel-16 slot-based PUCCH repetition operation, sub-slot based PUCCH repetition configured with/using RRC parameter nrofSlots (i.e., not using dynamic indication) of all UCI types (incl. HARQ, SR & CSI) may be supported.

For sub-slot based PUCCH repetition, for a PUCCH resource, if both a new repetition parameter corresponding to Rel-17 dynamic PUCCH repetition factor indication and the Rel-15/16 RRC parameter nrofSlots are configured, the new repetition parameter overrides nrofSlots.

For PUCCH repetition based on dynamic indication, a field included in a DCI format may indicate a PUCCH repetition number from a set of values (which may be configured by RRC message/signaling).

Sub-slot based (and/or slot based) PUCCH repetition based on semi-static configuration and SPS HARQ-ACK deferral may not be configured/applied together/jointly/simultaneously for a UE. For example, UE may not be expected to be configured with both sub-slot based (and/or slot based) PUCCH repetition based on semi-static configuration and SPS HARQ-ACK deferral. Sub-slot based (and/or slot based) PUCCH repetition based on dynamic indication and SPS HARQ-ACK deferral may not be configured/applied together/jointly/simultaneously for a UE. For example, UE may not be expected to be configured with both sub-slot based (and/or slot based) PUCCH repetition based on dynamic indication and SPS HARQ-ACK deferral.

Sub-slot based (and/or slot based) PUCCH repetition based on semi-static configuration and SPS HARQ-ACK deferral may be configured/applied together/jointly/simultaneously for a UE. Sub-slot based (and/or slot based) PUCCH repetition based on dynamic indication and SPS HARQ-ACK deferral may be configured/applied together/jointly/simultaneously for a UE.

In case that the number of PUCCH repetitions (provided by RRC or dynamically indicated by L1 signaling (DCI, PDCCH)) is larger than 1, SPS HARQ-ACK deferral may not be triggered/applied (no matter whether SPS HARQ-ACK deferral is configured/enabled or not). In yet another example, In case that the number of PUCCH repetitions (provided by RRC or dynamically indicated by L1 signaling (DCI, PDCCH)) is larger than 1 and all the repetitions (for SPS HARQ-ACK) are dropped (e.g., due to UL/DL conflicts), SPS HARQ-ACK deferral may be triggered/applied. In yet another example, in case that the number of PUCCH repetitions (provided by RRC or dynamically indicated by L1 signaling (DCI, PDCCH)) is larger than 1 and not all the repetitions (for SPS HARQ-ACK) are dropped (e.g., due to UL/DL conflicts), SPS HARQ-ACK deferral may not be triggered/applied (no matter whether SPS HARQ-ACK deferral is configured/enabled or not). In yet another example, in case that the number of PUCCH repetitions (provided by RRC or dynamically indicated by L1 signaling (DCI, PDCCH)) is larger than 1 and any of the repetitions (for SPS HARQ-ACK) is dropped (e.g., due to UL/DL conflicts), SPS HARQ-ACK deferral may be triggered/applied. UE may be provided by a dedicated capability message/signaling (or report through a capability message/signaling) and/or RRC message/signaling/parameter indicating which behavior/example mentioned above is applied and/or whether any of the behaviors/examples mentioned above is supported or not.

For interaction of SPS HARQ deferral and PUCCH repetition, there may be some alternatives to handle. In a design (Alt. 1), simultaneous configuration of PUCCH repetition and Rel-17 SPS HARQ-ACK deferral is not supported. For example, UE is not expected to be configured with RRC parameter nrofSlots for any applicable PUCCH format and not expected to be configured with repetition for any PUCCH resource for the Rel-17 dynamic PUCCH repetition indication operation. In yet another design (Alt. 2), if the PUCCH format or PUCCH resource in the initial slot has a PUCCH repetition factor larger than 1, no HARQ-ACK deferral is triggered. Additionally or alternatively, if the PUCCH format or PUCCH resource in the initial/target slot has a PUCCH repetition factor larger than 1, the PUCCH repetition for SPS HARQ-ACKs follows the R16 rule without considering the rules/limitations of SPS deferral. For example, parallel deferral procedures are prevented. Depending on the PUCCH format and/or PUCCH resource and its associated PUCCH repetition factor in the initial slot, deferral is prevented (for K>1). In yet another design (Alt. 3), SPS HARQ-ACK deferral for the case of PUCCH repetition in the initial slot may be supported. UE may be provided by a dedicated capability message/signaling (or report through a capability message/signaling) and/or RRC message/signaling/parameter indicating which behavior/example/alternative (e.g., Alt.1, Alt.2, Alt.3) mentioned above is applied and/or whether any of the behaviors/examples/alternatives (e.g., Alt.1, Alt.2, Alt.3) mentioned above is supported or not.

If joint operation of SPS HARQ deferral and PUCCH repetition is supported, there may be some alternatives to handle the maximum deferral values. In a design (Alt. 1), the maximum deferral value in terms of k1+k1def is the latest PUCCH starting slot, no matter with actual PUCCH repetition number (i.e., the deferral conditions for some SPS HARQ bit for deferral are checked only for the first PUCCH repetition/the target PUCCH slot). In yet another design (Alt. 2), the maximum deferral value in terms of k1+k1def is considered per PUCCH repetition occasion (i.e., if not all PUCCH repetitions are within the maximum deferral bound, the remaining PUCCH repetitions are cancelled). In yet another design (Alt. 3), all the PUCCH repetitions of the PUCCH repetition bundle need to be within the maximum deferral value in terms of k1+k1def (otherwise, the deferred SPS HARQ-ACK bits where the condition is not fulfilled is dropped). UE may be provided by a dedicated capability message/signaling (or report through a capability message/signaling) and/or RRC message/signaling/parameter indicating which behavior/example/alternative (e.g., Alt.1, Alt.2, Alt.3) mentioned above is applied and/or whether any of the behaviors/examples/alternatives (e.g., Alt.1, Alt.2, Alt.3) mentioned above is supported or not.

For HARQ-ACK re-transmission, enhanced Type 3 HARQ-ACK codebook and/or one-shot triggering of HARQ-ACK re-transmission may be supported.

At least one enhanced Type 3 HARQ-ACK codebook with smaller size (compared to Rel-16) in Rel-17 may be supported. For enhanced Type 3 codebook, the codebook size of a single triggered enhanced Type 3 HARQ-ACK codebook at least determined by RRC configuration. The codebook construction uses HARQ processes as a bases (i.e. ordered according to HARQ-IDs and serving cells).

One-shot triggering (by a DL assignment) of HARQ-ACK re-transmission on a PUCCH resource other than enhanced Type 2 or (enhanced) Type 3 HARQ-ACK codebook in Rel-17 may be supported.

Enhanced Type 3 HARQ-ACK codebook and/or one-shot triggering (by a DL assignment) of HARQ-ACK re-transmission on a PUCCH resource other than enhanced Type 2 or (enhanced) Type 3 HARQ-ACK codebook may be subject to separate UE capabilities. UE may be provided by a dedicated capability message/signaling (or report through a capability message/signaling) and/or RRC message/signaling/parameter indicating whether enhanced Type 3 HARQ-ACK codebook is supported or not. UE may be provided by a dedicated capability message/signaling (or report through a capability message/signaling) and/or RRC message/signaling/parameter indicating whether one-shot triggering (by a DL assignment) of HARQ-ACK re-transmission is supported or not.

Enhanced Type 3 HARQ-ACK codebook and one-shot triggering (by a DL assignment) of HARQ-ACK re-transmission on a PUCCH resource other than enhanced Type 2 or (enhanced) Type 3 HARQ-ACK codebook may not be configured/applied together/jointly/simultaneously for a UE. For example, UE may not be expected to be configured with both enhanced Type 3 HARQ-ACK codebook and one-shot triggering (by a DL assignment) of HARQ-ACK re-transmission.

Enhanced Type 3 HARQ-ACK codebook and one-shot triggering (by a DL assignment) of HARQ-ACK re-transmission on a PUCCH resource other than enhanced Type 2 or (enhanced) Type 3 HARQ-ACK codebook may be configured/applied together/jointly/simultaneously for a UE.

Enhanced Type 3 HARQ-ACK codebook (and/or one-shot triggering of HARQ-ACK re-transmission) and SPS HARQ-ACK deferral may not be configured/applied together/jointly/simultaneously for a UE. For example, UE may not be expected to be configured with both enhanced Type 3 HARQ-ACK codebook (and/or one-shot triggering of HARQ-ACK re-transmission) and SPS HARQ-ACK deferral.

Enhanced Type 3 HARQ-ACK codebook (and/or one-shot triggering of HARQ-ACK re-transmission) and SPS HARQ-ACK deferral may be configured/applied together/jointly/simultaneously for a UE.

In case that enhanced Type 3 HARQ-ACK codebook (and/or one-shot triggering of HARQ-ACK re-transmission) is used to transmit the dropped SPS HARQ ACK (due to UL/DL conflicts), SPS HARQ-ACK deferral may not be triggered/applied (no matter whether SPS HARQ-ACK deferral is configured/enabled or not). In yet another design, if SPS HARQ-ACK deferral is triggered/applied to the dropped SPS HARQ ACK (due to UL/DL conflicts), the dropped SPS HARQ ACK may not be retransmitted by enhanced Type 3 HARQ-ACK codebook (and/or one-shot triggering of HARQ-ACK re-transmission) no matter whether enhanced Type 3 HARQ-ACK codebook (and/or one-shot triggering of HARQ-ACK re-transmission) is configured/enabled or not. In yet another design, both SPS HARQ-ACK deferral and enhanced Type 3 HARQ-ACK codebook (and/or one-shot triggering of HARQ-ACK re-transmission) may be used to transmit the dropped SPS HARQ ACK (due to UL/DL conflicts).

PUCCH carrier switching based on dynamic indication in DCI scheduling a PUCCH and semi-static configuration (e.g., RRC message/signaling) may be supported. Dynamic indication and/or semi-static configuration may be subject to separate UE capabilities. UE may be provided by a dedicated capability message/signaling (or report through a capability message/signaling) and/or RRC message/signaling/parameter indicating whether PUCCH carrier switching based on semi-static configuration (e.g., using RRC parameter/message/signaling) is supported or not. UE may be provided by a dedicated capability message/signaling (or report through a capability message/signaling) and/or RRC message/signaling/parameter indicating whether PUCCH carrier switching based on dynamic indication in DCI scheduling a PUCCH is supported or not.

For PUCCH carrier switching, the PUCCH configuration (e.g., RRC parameter/message/signaling pucch-Config/PUCCH-ConfigurationList) is per UL BWP (i.e. per candidate cell and UL BWP of that specific candidate cell).

For semi-static and dynamic indication of PUCCH cell switching, the PUCCH repetition factor is determined based on the PUCCH format or PUCCH resource on the target PUCCH cell for the first repetition. In case that sub-slot based PUCCH repetition is supported for the PUCCH format or PUCCH resource on the target PUCCH cell, sub-slot based PUCCH repetition is applied/triggered on the target PUCCH cell no matter whether sub-slot based PUCCH repetition or slot based PUCCH repetition is applied before cell switching (in the original/initial/previous PUCCH cell). If both a new repetition parameter corresponding to Rel-17 dynamic PUCCH repetition factor indication and the Rel-15/16 RRC parameter nrofSlots are configured on the target PUCCH cell, the new repetition parameter overrides nrofSlots. If the DCI triggering PUCCH cell switching includes a dynamic indication for PUCCH repetition factor, the PUCCH repetition factor from the DCI is applied for the PUCCH transmission on the target PUCCH cell (e.g., overrides the PUCCH repetition factor from the DCI overrides other PUCCH repetition factors (provided by target PUCCH cell and/or original/initial/previous PUCCH cell). In yet another design, repetition factor determined based on the PUCCH format or PUCCH resource on the target PUCCH cell is always applied for the PUCCH transmission on the target PUCCH cell.

The semi-static PUCCH carrier switching configuration operation is based on RRC configured PUCCH cell timing pattern of applicable PUCCH cells and supports PUCCH carrier switching across cells with different numerologies. Semi-static PUCCH carrier switching is applicable to all UCI types including HARQ-ACK, SR and CSI. For semi-static PUCCH cell switching, PCell/PSCell/PUCCH-SCell is reference cell. The time domain pattern configurations are based on the numerology of the reference cell. The PDSCH to HARQ-ACK offset k1 is interpreted based on the numerology and PUCCH configuration of a reference cell to be able to apply the time-domain PUCCH cell switching pattern. For semi-static PUCCH cell switching, the time-domain pattern configuration is based on the following properties. A single time-domain pattern is configured per PUCCH cell group. The granularity of the time-domain pattern is one slot of the PCell/PSCell/PUCCH-SCell. The time-domain pattern is applied periodically. Parameters (e.g., period/pattern length) for the time-domain pattern may configured by RRC (RRC message/signaling transmitted from gNB to UE). For example, gNB may send UE a dedicated RRC message/signaling including a parameter(s) to indicate period and/or pattern length for the time-domain pattern. The pattern defines for each slot of the PCell/PSCell/PUCCH-SCell at least the applicable target PUCCH cell. For semi-static PUCCH cell switching, the PUCCH resource indicator (PRI) is interpreted based on the PUCCH configuration of determined target PUCCH cell. The periodicity/length of the time-domain pattern for semi-static PUCCH cell switching may be directly determined by the RRC configuration of the time domain pattern RRC parameter pucchCellPattern (pucchCellPattern has a variable length of (1 . . . maxNrofSlots)).

For PUCCH carrier switching based on semi-static operation, for the case the PCell slot to be longer than the target PUCCH cell slot or sub-slot (i.e. multiple target PUCCH cell slots overlapping with a single PCell slot), the following PUCCH cell slot is used for UCI transmission. In a design (Alt. 1), the first target PUCCH slot overlapping with the PCell slot is used. In yet another design (Alt. 2), a relative slotoffset within the reference cell slot is used. The relative slot offset is configured in the time domain pattern (i.e. time domain pattern contains 'cell index' & 'slot_offset' for each reference cell slot). Different relative slot offset can be configured for each reference cell slot in the time domain pattern. UE may be provided by a dedicated capability message/signaling (or report through a capability message/signaling) and/or RRC message/signaling/parameter indicating which behavior/example/alternative (e.g., Alt.1, Alt.2) mentioned above is applied and/or whether any of the behaviors/examples/alternatives (e.g., Alt.1, Alt.2) mentioned above is supported or not.

For PUCCH carrier switching based on semi-static operation, for the case the PCell slot to be shorter than the target PUCCH cell slot, the following behavior may be adopted. In a design (Alt. 1), UE does not expect the same UCI type (i.e. HARQ-ACK, SR or CSI) from more than one PCell PUCCH slot to be overlapping with a single dynamically indicated PUCCH cell slot. There can be e.g. HARQ-ACK only be present in either of the overlapping slots, but not in more than one overlapping slot. In yet another design (Alt. 2), UE does not expect a semi-static PUCC cell configuration, where a single target PUCCH slot/sub-slot would be overlapping with more than one PCell slot/sub-slot. UE may be provided by a dedicated capability message/signaling (or report through a capability message/signaling) and/or RRC message/signaling/parameter indicating which behavior/example/alternative (e.g., Alt.1, Alt.2) mentioned above is applied and/or whether any of the behaviors/examples/alternatives (e.g., Alt.1, Alt.2) mentioned above is supported or not.

For PUCCH carrier switching based on dynamic indication in DCI scheduling a PUCCH, the PDSCH to HARQ-ACK offset k1 may be interpreted based on the numerology of the dynamically indicated target PUCCH cell. In addition to HARQ-Ack of PDSCH dynamically scheduled by a DCI indicating a PUCCH carrier, the dynamic target carrier indication also applies to: HARQ-ACK corresponding to the first SPS PDSCH activated by Activation DCI based on the indication in the activation DCI; HARQ-ACK corresponding to the SPS Release DCI based on the indication in the release DCI; triggered PUCCH for Rel-16 Type 3 CB, Rel-17 enh. Type 3 CB of smaller size and Rel-17 one-shot triggering for HARQ-Ack retransmission based on the indication in the triggering DCI. UE does not expect overlapping PUCCH slots with dynamic PUCCH cell indication on more than one cell, i.e., gNB should only dynamically indicate a single PUCCH cell for a final PUCCH slot.

For PUCCH cell switching based on dynamic indication in the DCI, a new, dedicated DCI field for the DCI scheduling PDSCH to indicate the target PUCCH cell may be introduced. In yet another design, an existing DCI field(s) (e.g., flag for differentiation, validity timer, segmented repetitions, HARQ/ACK enabler, PUSCH repetition adjustment, Scheduling delay, Scheduling delay offset, antenna port(s), transmission configuration indication, rate matching indicator, SRS request, PRB bundling size indicator, carrier indicator, CSI request, ZP CSI-RS triggering, beta offset indicator, SRS resource indicator, repetition factor, priority indication, HARQ process number, Frequency hopping flag, Number of resource units, Resource block assignment, TPC command for scheduled PUSCH, UL index, Downlink Assignment Index (DAI), DCI subframe repetition number, Modulation order override, Scheduling TBs for Unicast, HARQ index with offset, New data indicators, Redundancy version for all TBs, Flag for sub-PRB resource allocation, Modulation and coding scheme with offset and so on) for the DCI scheduling PDSCH may be reused to indicate the target PUCCH cell. PUCCH cell switching based on dynamic indication in the DCI using DCI format 1_2 (and/or other DCI formats, e.g., DCI format 1_0, DCI format 1_1) for a UE supporting DCI format 1_2 (and/or other DCI formats, e.g., DCI format 10, DCI format 1_1) may be supported. The presence of the 'PUCCH carrier switching' bitfield in DCI format 12 (and/or other DCI formats, e.g., DCI format 10, DCI format 1_1) is RRC configured. For example, gNB may send UE a dedicated RRC message/signaling including a parameter(s) to indicate whether the 'PUCCH carrier switching' bitfield in DCI format 1_2 (and/or other DCI formats, e.g., DCI format 10, DCI format 1_1) is presented or not. Reusing other DCI field in DCI format 12 (and/or other DCI formats, e.g., DCI format 10, DCI format 1_1) to indicate the 'PUCCH carrier switching' bitfield may be RRC configured. For example, gNB may send UE a dedicated RRC message/signaling including a parameter(s) to indicate whether the existing bitfield(s) in DCI format 1_2 (and/or other DCI formats, e.g., DCI format 1_0, DCI format 1_1) is reused to indicate 'PUCCH carrier switching' or not.

Multiplexing of HARQ-ACK (without dynamic PUCCH cell indication), SR and P/SP-CSI on the dynamically indicated PUCCH cell (other than PCell/PSCell/PUCCH-SCell) may be supported. UE may not expect overlapping HARQ-ACK (without dynamic PUCCH cell indication), SR and P/SP-CSI or overlapping HARQ-ACK (without dynamic PUCCH cell indication), SR and P/SP-CSI is to be dropped. Multiplexing of HARQ-ACK (without dynamic PUCCH cell indication), SR and P/SP-CSI on the dynamically indicated PUCCH cell (other than PCell/PSCell/PUCCH-SCell) may not be supported. UE may be provided by a dedicated capability message/signaling (or report through a capability message/signaling) and/or RRC message/signaling/parameter indicating which behavior/example/alternative mentioned above is applied and/or whether multiplexing of HARQ-ACK (without dynamic PUCCH cell indication), SR and P/SP-CSI on the dynamically indicated PUCCH cell (other than PCell/PSCell/PUCCH-SCell) is supported or not.

PUCCH carrier switching based on semi-static operation and SPS HARQ-ACK deferral may not be configured/applied together/jointly/simultaneously for a UE. For example, UE may not be expected to be configured with both PUCCH carrier switching based on semi-static operation and SPS HARQ-ACK deferral. PUCCH carrier switching based on dynamic indication in DCI scheduling a PUCCH and SPS HARQ-ACK deferral may not be configured/applied together/jointly/simultaneously for a UE. For example, UE may not be expected to be configured with both PUCCH carrier switching based on dynamic indication in DCI scheduling a PUCCH and SPS HARQ-ACK deferral.

PUCCH carrier switching based on semi-static operation and SPS HARQ-ACK deferral may be configured/applied together/jointly/simultaneously for a UE. PUCCH carrier switching based on dynamic indication in DCI scheduling a PUCCH and SPS HARQ-ACK deferral may be configured/applied together/jointly/simultaneously for a UE.

In case that PUCCH carrier switching based on semi-static operation is triggered/enabled/applied, SPS HARQ-ACK deferral may not be triggered/applied (no matter whether SPS HARQ-ACK deferral is configured/enabled or not). In yet another example, in case that PUCCH carrier switching based on semi-static operation is triggered/enabled/applied, SPS HARQ-ACK deferral may be triggered/applied (e.g., deferred SPS HARQ-ACK may be transmitted in the target PUCCH cell). In yet another example, in case that PUCCH carrier switching based on semi-static operation is triggered/enabled/applied, SPS HARQ-ACK deferral may not be triggered/applied (no matter whether SPS HARQ-ACK deferral is configured/enabled or not), e.g., deferred SPS HARQ-ACK may be dropped (in the target PUCCH cell). UE may be provided by a dedicated capability message/signaling (or report through a capability message/signaling) and/or RRC message/signaling/parameter indicating which behavior/example mentioned above is applied and/or whether any of the behaviors/examples mentioned above is supported or not.

In case that PUCCH carrier switching based on dynamic indication in DCI scheduling a PUCCH is triggered/enabled/applied, SPS HARQ-ACK deferral may not be triggered/applied (no matter whether SPS HARQ-ACK deferral is configured/enabled or not). In yet another example, in case that PUCCH carrier switching based on dynamic indication in DCI scheduling a PUCCH is triggered/enabled/applied, SPS HARQ-ACK deferral may be triggered/applied (e.g., deferred SPS HARQ-ACK may be transmitted in the target PUCCH cell). In yet another example, in case that PUCCH carrier switching based on dynamic indication in DCI scheduling a PUCCH is triggered/enabled/applied, SPS HARQ-ACK deferral may not be triggered/applied (no matter whether SPS HARQ-ACK deferral is configured/enabled or not), e.g., deferred SPS HARQ-ACK may be dropped (in the target PUCCH cell). UE may be provided by a dedicated capability message/signaling (or report through a capability message/signaling) and/or RRC message/signaling/parameter indicating which behavior/example mentioned above is applied and/or whether any of the behaviors/examples mentioned above is supported or not.

For semi-static PUCCH cell switching and PUCCH repetition, a PUCCH repetition mapping to a different target PUCCH cell from the target PUCCH cell of the first PUCCH repetition is not supported (i.e., the target PUCCH cell determination only applies to the first PUCCH repetition). For semi-static PUCCH cell switching, the target PUCCH cell determined for the first PUCCH repetition applies to the PUCCH repetition bundle based on the Rel-16 PUCCH repetition procedure.

Sub-slot based (and/or slot based) PUCCH repetition based on semi-static configuration and PUCCH carrier switching based on dynamic indication in DCI scheduling a PUCCH (and/or semi-static configuration) may not be configured/applied together/jointly/simultaneously for a UE. For example, UE may not be expected to be configured with both sub-slot based (and/or slot based) PUCCH repetition based on semi-static configuration and PUCCH carrier switching based on dynamic indication in DCI scheduling a PUCCH (and/or semi-static configuration). Sub-slot based (and/or slot based) PUCCH repetition based on dynamic indication and PUCCH carrier switching based on dynamic indication in DCI scheduling a PUCCH (and/or semi-static configuration) may not be configured/applied together/jointly/simultaneously for a UE. For example, UE may not be expected to be configured with both sub-slot based (and/or slot based) PUCCH repetition based on dynamic indication and PUCCH carrier switching based on dynamic indication in DCI scheduling a PUCCH (and/or semi-static configuration).

Sub-slot based (and/or slot based) PUCCH repetition based on semi-static configuration and PUCCH carrier switching based on dynamic indication in DCI scheduling a PUCCH (and/or semi-static configuration) may be configured/applied together/jointly/simultaneously for a UE. Sub-slot based (and/or slot based) PUCCH repetition based on dynamic indication and PUCCH carrier switching based on dynamic indication in DCI scheduling a PUCCH (and/or semi-static configuration) may be configured/applied together/jointly/simultaneously for a UE.

In case that the number of PUCCH repetitions (provided by RRC or dynamically indicated by L1 signaling (DCI, PDCCH)) is larger than 1, the remaining PUCCH repetitions after cell switching may not be transmitted. In yet another example, In case that the number of PUCCH repetitions (provided by RRC or dynamically indicated by L1 signaling (DCI, PDCCH)) is larger than 1, the remaining PUCCH repetitions after cell switching may be transmitted in the target cell. In yet another example, in case that the number of PUCCH repetitions (provided by RRC or dynamically indicated by L1 signaling (DCI, PDCCH)) is larger than 1 and not all the repetitions are interrupted by cell switching, the remaining PUCCH repetitions after cell switching may not be transmitted in the target cell. In yet another example, in case that the number of PUCCH repetitions (provided by RRC or dynamically indicated by L1 signaling (DCI, PDCCH)) is larger than 1 and any of the repetitions is interrupted by cell switching, the remaining PUCCH repetitions after cell switching may be transmitted in the target cell. The number of PUCCH repetitions may be determined by the configuration/indication provided in the target PUCCH cell. UE may be provided by a dedicated capability message/signaling (or report through a capability message/signaling) and/or RRC message/signaling/parameter indicating which behavior/example mentioned above is applied and/or whether any of the behaviors/examples mentioned above is supported or not.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

CROSS REFERENCE

This Nonprovisional application claims priority under 35 U.S.C. § 119 on provisional Application No. 63/275,849 on Nov. 4, 2021, the entire contents of which are hereby incorporated by reference.

What is claimed is:

1. A user equipment (UE), comprising:

receiving circuitry configured to receive a first radio resource control (RRC) message comprising first information used for configuring a Semi-Persistent Scheduling (SPS) physical downlink shared channel (PDSCH) configuration, the receiving circuitry configured to receive a second RRC message comprising second information used for configuring that deferring of SPS hybrid automatic repeat request-acknowledgement (HARQ-ACK) is supported, the receiving circuitry configured to receive a third RRC message comprising third information used for configuring cell switching based on semi-static configuration and/or dynamic indication, and the receiving circuitry configured to receive, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission; and transmitting circuitry configured to transmit HARQ-ACK information based on a decoding of the SPS PDSCH transmission in a first slot/sub-slot in a first cell, the transmitting circuitry configured to defer the HARQ-ACK information transmission in a second slot/sub-slot in a second cell if cell switching is triggered and the first slot/sub-slot in the first cell is not available.

2. A base station (gNB), comprising:

transmitting circuitry configured to transmit a first radio resource control (RRC) message comprising first information used for configuring a Semi-Persistent Scheduling (SPS) physical downlink shared channel (PDSCH) configuration, the transmitting circuitry configured to transmit a second RRC message comprising second information used for configuring that deferring of SPS hybrid automatic repeat request-acknowledgement (HARQ-ACK) is supported, the transmitting circuitry configured to transmit a third RRC message comprising third information used for configuring cell switching based on semi-static configuration and/or dynamic indication, and the transmitting circuitry configured to transmit, based on a transmission of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission; and receiving circuitry configured to receive HARQ-ACK information in a first slot/sub-slot in a first cell, the receiving circuitry configured to receive a deferred HARQ-ACK information transmission in a second slot/sub-slot in a second cell if cell switching is triggered and the first slot/sub-slot in the first cell is not available.

3. A method by a user equipment (UE), comprising:

receiving a first radio resource control (RRC) message comprising first information used for configuring a Semi-Persistent Scheduling (SPS) physical downlink shared channel (PDSCH) configuration;

receiving a second RRC message comprising second information used for configuring that deferring of SPS hybrid automatic repeat request-acknowledgement (HARQ-ACK) is supported;

receiving a third RRC message comprising third information used for configuring cell switching based on semi-static configuration and/or dynamic indication;

receiving, based on a detection of a physical downlink control channel (PDCCH) carrying a downlink control information (DCI) format with cyclic redundancy check (CRC) scrambled by a first radio network identifier (RNTI) for an activation of the SPS PDSCH, the SPS PDSCH transmission;

transmitting HARQ-ACK information based on a decoding of the SPS PDSCH transmission in a first slot/sub-slot in a first cell; and deferring the HARQ-ACK information transmission in a second slot/sub-slot in a second cell if cell switching is triggered and the first slot/sub-slot in the first cell is not available, determining a joint coding for more than two bits of total payload for deferred SPS HARQ-ACK from the first cell and normal HARQ-ACK on a physical uplink control channel (PUCCH) in the second cell;

determining a PUCCH resource based on the total HARQ-ACK payload from sets of PUCCH resources;

determining a number of physical resource blocks (PRBs) for a PUCCH transmission based on the total HARQ-ACK payload and a maxCodeRate on the selected PUCCH resource;

multiplexing the deferred SPS HARQ-ACK and the normal HARQ-ACK based on the determined joint coding; and transmitting the multiplexed HARQ-ACK on the PUCCH;

wherein the deferred SPS HARQ-ACK from the first cell and the normal HARQ-ACK in the second cell are concatenated into a single joint HARQ-ACK codebook for the PUCCH transmission;

wherein if the total HARQ-ACK payload exceeds a maximum payload size of all configured sets of HARQ-ACK PUCCH resources, the method comprises:

transmitting the deferred SPS HARQ-ACK on a normal PUCCH based on a payload of the normal HARQ-ACK; and dropping the normal HARQ-ACK codebook.

* * * * *